(12) United States Patent
Chae et al.

(10) Patent No.: US 10,498,740 B2
(45) Date of Patent: Dec. 3, 2019

(54) METHOD, APPARATUS, AND SYSTEM FOR CREATING SERVICE ACCOUNT

(71) Applicant: Samsung Electronics Co., Ltd., Gyeonggi-do (KR)

(72) Inventors: Sang Ho Chae, Anyang-si (KR); Ja Yong Koo, Seoul (KR); Jae Won Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 15/430,371

(22) Filed: Feb. 10, 2017

(65) Prior Publication Data

US 2017/0237744 A1    Aug. 17, 2017

(30) Foreign Application Priority Data

Feb. 11, 2016  (KR) .................. 10-2016-0015832
Jul. 29, 2016  (KR) .................. 10-2016-0097078

(51) Int. Cl.
*H04L 29/06* (2006.01)
*G06F 3/0482* (2013.01)
*G06F 3/0488* (2013.01)
*G06F 3/048* (2013.01)

(52) U.S. Cl.
CPC ............ *H04L 63/102* (2013.01); *G06F 3/048* (2013.01); *G06F 3/0482* (2013.01); *G06F 3/0488* (2013.01); *H04L 63/083* (2013.01)

(58) Field of Classification Search
CPC ..... H04L 63/102; H04L 63/083; G06F 3/048; G06F 3/0482; G06F 3/0488
See application file for complete search history.

(56) References Cited

U.S. PATENT DOCUMENTS

| | | | | |
|---|---|---|---|---|
| 9,324,067 B2* | 4/2016 | Van Os | ............. | G06Q 20/322 |
| 9,491,155 B1* | 11/2016 | Johansson | ........... | H04L 63/0807 |
| 9,554,255 B2 | 1/2017 | Mogalapalli | | |
| 10,200,377 B1* | 2/2019 | Vazquez | ............. | H04L 63/0861 |
| 2011/0302630 A1* | 12/2011 | Nair | ........................ | G06F 21/41 726/4 |
| 2013/0298215 A1* | 11/2013 | Kuznetsov | ............ | H04L 9/3263 726/8 |
| 2014/0108801 A1* | 4/2014 | McBride | ............. | H04L 63/0807 713/168 |
| 2014/0181934 A1* | 6/2014 | Mayblum | ............... | H04L 63/10 726/7 |
| 2014/0302825 A1 | 10/2014 | Mogalapalli | | |

(Continued)

*Primary Examiner* — Joseph P Hirl
*Assistant Examiner* — Stephen T Gundry

(57) ABSTRACT

A system for creating a service account includes a first server associated with a first application, a second server associated with a second application, and an electronic device that is capable of communicating with the first server and the second server. The electronic device is configured to receive user information by executing the first application and verify or generate a first account corresponding to the first application through interaction with the first server, based on the user information. The electronic device is also configured to generate a second account corresponding to the second application through interaction with the second server, based on at least a portion of the user information if the second application is executed in response to a specified event.

18 Claims, 12 Drawing Sheets

(56) References Cited

U.S. PATENT DOCUMENTS

| | | | |
|---|---|---|---|
| 2015/0007297 A1* | 1/2015 | Grossemy | G06F 21/31 726/7 |
| 2015/0081559 A1* | 3/2015 | Dua | G06Q 20/20 705/44 |
| 2015/0220914 A1* | 8/2015 | Purves | G06Q 20/36 705/26.8 |
| 2015/0319170 A1* | 11/2015 | Grossemy | G06F 21/31 713/186 |
| 2015/0348001 A1* | 12/2015 | Van Os | G06Q 20/40 705/44 |
| 2016/0112262 A1* | 4/2016 | Johnson | G06F 9/45504 709/221 |
| 2016/0232534 A1* | 8/2016 | Lacey | G06Q 20/38215 |
| 2016/0247144 A1* | 8/2016 | Oh | G06Q 20/3278 |
| 2016/0253651 A1* | 9/2016 | Park | G07F 9/023 705/39 |
| 2016/0253652 A1* | 9/2016 | Je | G06Q 20/34 705/39 |
| 2016/0253665 A1* | 9/2016 | Van Os | G06Q 20/40 705/44 |
| 2016/0253669 A1* | 9/2016 | Yoon | G06Q 20/4014 705/75 |
| 2016/0253670 A1* | 9/2016 | Kim | G06Q 20/4012 705/72 |
| 2017/0061419 A1* | 3/2017 | Kim | G06Q 20/102 |
| 2017/0083882 A1* | 3/2017 | Kim | G06Q 20/102 |
| 2017/0279971 A1* | 9/2017 | Raleigh | H04W 4/50 |
| 2017/0337542 A1* | 11/2017 | Kim | G06F 3/041 |
| 2018/0341937 A1* | 11/2018 | Kim | G06Q 20/16 |

\* cited by examiner

METHOD, APPARATUS, AND SYSTEM FOR CREATING SERVICE ACCOUNT

CROSS-REFERENCE TO RELATED APPLICATION(S) AND CLAIM OF PRIORITY

The present application is related to and claims the benefit under 35 U.S.C. § 119(a) of a Korean patent application filed on Feb. 11, 2016 in the Korean Intellectual Property Office and assigned Serial number 10-2016-0015832, and a Korean patent application filed on Jul. 29, 2016 in the Korean Intellectual Property Office and assigned Serial number 10-2016-0097078, the entire disclosure of which is hereby incorporated by reference.

TECHNICAL FIELD

This disclosure relates to a method, a device, and a system that easily create a plurality of service accounts.

BACKGROUND

Nowadays, an electronic device is implemented with a smartphone, a tablet PC, a smart TV, a wearable device (e.g., a smart watch or the like), or the like. The electronic device may provide a user with various functions and services based on an application program (hereinafter called "application") that has been installed in the electronic device.

The application may be developed by, for example, a manufacturer of the electronic device, a manufacturer of an operating system (OS), a mobile network operator (MNO), a third party developer, or the like. Generally, to stably provide a service based on the application, the various developers lead each user or device to verify (or sign in) or create (or sign up) a service account.

For example, in the case where the electronic device is booted up for the first time (e.g., an electronic device that was newly bought is powered up for the first time), the service account may be iteratively verified and/or created for each account.

Referring to FIG. 10, for example, if the electronic device is booted up for the first time, as in screens 1011 to 1014, the user may establish set network connectivity through a user interface (UI) screen output in a display (a screen 1010). Afterwards, the electronic device may verify or create a first account 1020, a second account 1030, and a third account 1040 based on information that the user enters. For example, the user may utilize seven screens 1021 to 1027 to verify or create the first account 1020. The user may utilize four UI screens 1031 to 1034 to verify or create the second account 1030. The user may utilize five UI screens 1041 to 1045 to verify or create the third account 1040. That is, the user needs to enter personal information (e.g., an ID, a password, or the like) of the user for each account to verify or create the first to third accounts 1020 to 1040.

According to an embodiment in FIG. 10, in the case where the user needs to create a plurality of accounts, the electronic device requests personal information from the user for each account. Accordingly, it is troublesome for the user, which wants to create the plurality of accounts, to enter the personal information through a plurality of UI screens. This is not limited to the case in which the electronic device is booted up for the first time. For example, even though verification/creation of the first account 1020 is postponed (or skipped) when the electronic device is booted up for the first time, a plurality of UIs for verifying or creating the first to third accounts 1020 to 1040 may be output.

According to another embodiment, a method for creating a second account, which depends on the first account, by using the first account that the user previously creates may be considered. However, according to the embodiment, in the creation of the second account, the electronic device frequently makes a complex communication (e.g., a transfer of an access token between account management servers, or the like) with a server that manages the first account. For this reason, communication traffic increases and a speed at which the second account is created decreases. In addition, since the second account is managed according to settings of the first account, it is difficult to independently manage the second account.

SUMMARY

To address the above-discussed deficiencies, it is a primary object to provide a method that is capable of easily and independently creating a plurality of service accounts through sharing user information in an electronic device, and an electronic device and a system that perform the same.

In accordance with an aspect of this disclosure, a system for creating a service account includes a first server associated with a first application, a second server associated with a second application, and an electronic device that is capable of communicating with the first server and the second server. The electronic device is configured to receive user information by executing the first application, to verify or generate a first account corresponding to the first application through interaction with the first server, based on the user information, and to generate a second account corresponding to the second application through interaction with the second server, based on at least a portion of the user information if the second application is executed in response to a specified event.

In accordance with an aspect of this disclosure, an electronic device includes a memory configured to store a first application and a second application, a communication circuit configured to establish a communication connection with a first server associated with the first application and a second server associated with the second application, and a processor operatively connected with the memory and the communication circuit. The processor is configured to receive user information by executing the first application, to verify or generate a first account corresponding to the first application through the interaction with the first server, based on the user information, and to generate a second account corresponding to the second application through the interaction with the second server, based on at least a portion of the user information if the second application is executed in response to a specified event.

In accordance with an aspect of this disclosure, a method for creating a service account includes establishing, by an electronic device, a communication connection with a first server associated with a first application and a second server associated with a second application, receiving, by the electronic device, user information by executing the first application, verifying or generating, by the electronic device, a first account corresponding to the first application through the interaction with the first server, based on the user information, and generating, by the electronic device, a second account corresponding to the second application based on at least a portion of the user information through the interaction with the second server if the second application is executed in response to a specified event.

Other aspects, advantages, and salient features of the disclosure will become apparent to those skilled in the art from the following detailed description, which, taken in conjunction with the annexed drawings, discloses various embodiments of this disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
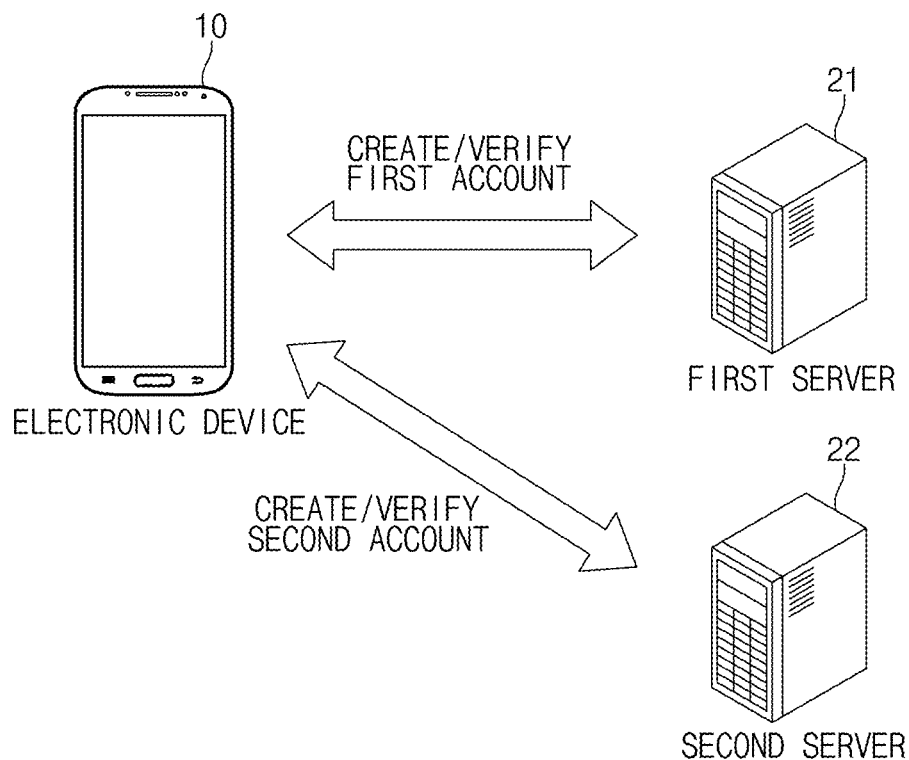
FIG. 1 illustrates a system that creates a service account, according to various embodiments.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of this disclosure may be described with reference to accompanying drawings. Accordingly, those of ordinary skill in the art will recognize that modification, equivalent, and/or alternative on the various embodiments described herein can be variously made without departing from the scope and spirit of this disclosure. With regard to description of drawings, similar components may be marked by similar reference numerals.

In this disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of this disclosure, but do not limit the elements. For example, "a first user device" and "a second user device" indicate different user devices regardless of the order or priority. For example, "a first user device" and "a second user device" indicate different user devices. For example, without departing the scope of this disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this disclosure are used to describe specified embodiments of this disclosure and are not intended to limit the scope of this disclosure. The terms of a singular form may include plural forms unless otherwise specified.

All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of this disclosure. In some cases, even if terms are terms which are defined in the specification, they may not be interpreted to exclude embodiments of this disclosure.

An electronic device according to various embodiments of this disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or an implantable type (e.g., an implantable circuit).

According to an embodiment, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., SAMSUNG HOMESYNC™, APPLE TV®, or GOOGLE TV®), game consoles (e.g., XBOX® and PLAYSTATION®), electronic dictionaries, electronic keys, camcorders, electronic picture frames, and the like.

According to various embodiments, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global navigation satellite system (GNSS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment may not be limited to the above-described electronic devices and may include other electronic devices and new electronic devices according to the development of technologies.

Hereinafter, electronic devices according to various embodiments will be described with reference to the accompanying drawings. The term "user" used herein may refer to a person who uses an electronic device or may refer to a device (e.g., an artificial intelligence electronic device) that uses an electronic device.

FIG. 1 illustrates a system that creates a service account, according to various embodiments.

Referring to FIG. 1, according to an embodiment, a system may include an electronic device 10, a first server 21 associated with a first application, and a second server 22 associated with a second application. The electronic device 10 may establish a communication connection with the first server 21 and the second server 22 over a wireless/wired network.

For example, the electronic device 10 may execute the first application (a first account managing application) that manages a first account of a user. If the first application is executed, the electronic device 10 may obtain user information from the user through a UI screen of the first application. For example, in the case where the user verifies the first account, the user may enter an ID of the first account and a password of the first account as the user information. As another example, in the case where the user creates the first account, the user may enter the ID of the first account, the password of the first account, a name of the user, date of birth, an email address, a telephone number, or a combination thereof as the user information.

Next, the electronic device 10 may verify or create the first account through interaction with the first server based on the user information obtained from the user. For example, the electronic device 10 may provide the first server 21 with the user information to request the first server 21 to verify or create the first account. The first server 21 may return the verification or creation result of the first account to the electronic device 10 in response to the request.

According to an embodiment, the electronic device 10 may execute the second application (a second account managing application) that manages a second account of the user to create the second account through interaction with the second server 22, in response to a specified event. In the case, the electronic device 10 may create the second account based on at least a portion of the user information used to verify or create the first account. The at least a portion of the user information used to create the second account may include at least one of, for example, the email address or the telephone number.

In addition, according to an embodiment, the specified event may correspond to an event for agreeing to create the second account based on the first account. For example, the specified event may include interaction through a UI screen. For example, a notice (e.g., terms of service, or the like) for obtaining agreement with creating the second account may be included in the UI screen.

The first server 21 may operate in conjunction with the first application that is executable in the electronic device 10. For example, the first server 21 associated with the first application may correspond to an account managing server that manages first accounts of a plurality of users. For example, the first server 21 may perform overall management of the first account, for example, issuing a verification token associated with the first account, or the like, in response to the request of the electronic device 10.

According to an embodiment, the first server 21 may create the first account through interaction with the electronic device 10. For example, the first server 21 may receive the user information, which the user enters, from the electronic device 10. The first server 21 may verify or create the second first account by using the received user information.

The second server 22 may operate in conjunction with the second application that is executable in the electronic device 10. For example, the second server 22 associated with the second application may correspond to an account managing server that manages second accounts of the plurality of users. For example, the second server 22 may perform overall management of the second account, for example, issuing a verification token associated with the second account, or the like, in response to the request of the electronic device 10.

According to an embodiment, the second server 22 may create the second account through the interaction with the electronic device 10. For example, the second server 22 may receive the at least a portion of the user information (including at least one of an email address or a telephone number of the user), which is used to verify or create the first account, from the electronic device 10. The second server 22 may designate the email address or the telephone number, which is included in at least a portion of the received user information, as an ID of the second account.

Furthermore, if the second server 22 receives the at least a portion of the user information (including at least one of the email address or the telephone number of the user) from the electronic device 10, the second server 22 may randomly create a password of the second account and may send the password to at least one of the email address or the telephone number. For example, the randomly created password of the second account may be included in a specified message and may be sent through an email, SMS/MMS, an instant messaging (IM) service, or the like. A notice for resetting a password, additional information (e.g., a request for agreement to additional terms and conditions) about the second account, a related link, and the like as well as the password may be further included in the specified message, in which the password of the second account is included.

Figure 2:
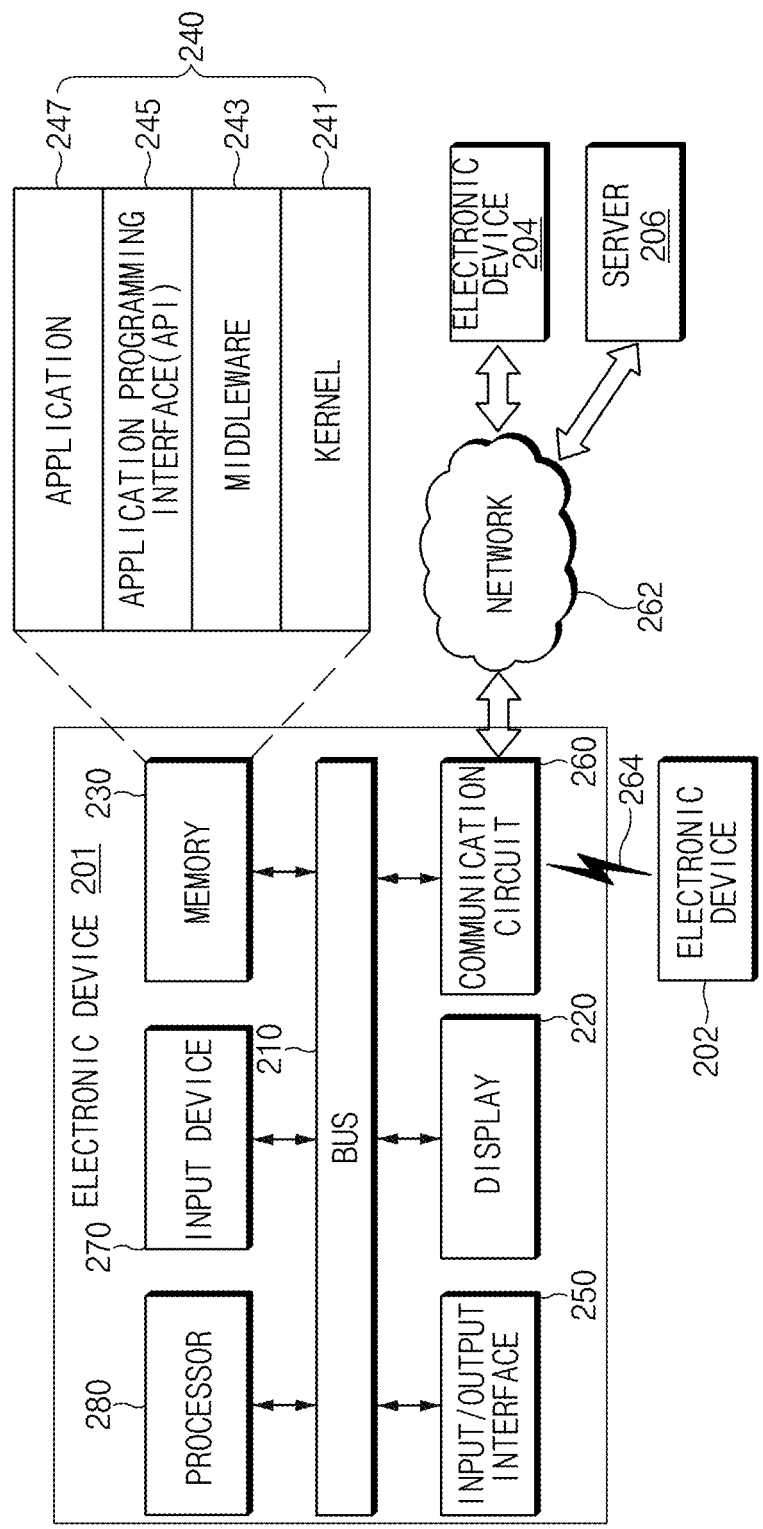
FIG. 2 illustrates an electronic device in a network environment, according to various embodiments.

FIG. 2 illustrates an electronic device in a network environment, according to various embodiments.

Referring to FIG. 2, according to various embodiments, an electronic device 201 or 202 (e.g., the electronic device 10 of FIG. 1) or a server 204 or 206 may be connected with each other over a network 262 or a local area network 264. The electronic device 201 may include a bus 210, a display 220, a memory 230, an input/output interface 250, a communication circuit 260, an input device 270, and a processor 280. According to an embodiment, the electronic device 201 may not include at least one of the above-described elements or may further include other element(s).

The bus 210 may be, for example, a circuit which connects the elements 210 to 280 with each other and sends communication (e.g., a control message and/or data) between the elements.

The display 220 may display, for example, various contents (e.g., a text, an image, a video, an icon, a symbol, and the like) to a user. The display 220 may include a touch screen and may receive, for example, a touch, gesture, proximity, or hovering input using an electronic pen or a part of the user's body. For example, the display 220 may output a UI screen of a first or second application under control of the processor 280 to obtain a user input (e.g., user information) through the UI screen.

The display 220 may include, for example, a liquid crystal display (LCD), a light-emitting diode (LED) display, an organic LED (OLED) display, a microelectromechanical systems (MEMS) display, or an electronic paper display.

The memory 230 may include a volatile and/or nonvolatile memory. For example, the memory 230 may store instructions or data associated with at least one other element(s) of the electronic device 201. According to an embodiment, the memory 230 may store software and/or a program 240. For example, the memory 230 may store the first application and the second application that are described below. Each of the first application and the second application may correspond to an application that manages a service account of the user.

The program 240 may include, for example, a kernel 241, a middleware 243, an application programming interface (API) 245, and/or an application program (or an "application") 247 (e.g., the first application and the second application that are described below). At least a part of the kernel 241, the middleware 243, or the API 245 may be referred to as an "operating system (OS)".

The kernel 241 may control or manage system resources (e.g., the bus 210, the processor 280, the memory 230, and the like) that are used to execute operations or functions of other programs (e.g., the middleware 243, the API 245, and the application program 247). Furthermore, the kernel 241 may provide an interface that allows the middleware 243, the API 245, or the application program 247 to access discrete elements of the electronic device 201 so as to control or manage system resources.

The middleware 243 may perform, for example, a mediation role such that the API 245 or the application program 247 communicates with the kernel 241 to exchange data.

Furthermore, the middleware 243 may process one or more task requests received from the application program 247 according to a priority. For example, the middleware 243 may assign the priority, which makes it possible to use a system resource (e.g., the bus 210, the processor 280, the memory 230, or the like) of the electronic device 201, to at least one of the application program 247. For example, the middleware 243 may process the one or more task requests according to the priority assigned to the at least one, which makes it possible to perform scheduling or load balancing on the one or more task requests.

The API 245 may be an interface through which the application program 247 controls a function provided by the kernel 241 or the middleware 243, and may include, for example, at least one interface or function (e.g., an instruction) for a file control, a window control, image processing, a character control, or the like.

The input/output interface 250 may transmit an instruction or data, input from a user or another external device, to other element(s) of the electronic device 201. Furthermore, the input/output interface 250 may output an instruction or data, received from other component(s) of the electronic device 201, to a user or another external device.

The communication circuit 260 may establish communication between the electronic device 201 and an external device (e.g., an external electronic device 202, the first server 204, or the second server 206). For example, the communication circuit 260 may be connected to the network 262 through wireless communication or wired communication to communicate with the external device (e.g., the first server 204 or the second server 206). According to various embodiments, the first server 204 may correspond to a management server of a first account and may operate in conjunction with the first application stored in the memory 230 to manage the first account. As in the first server 204, the second server 206 may correspond to a management server of a second account and may operate in conjunction with the second application stored in the memory 230 to manage the second account.

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), as a cellular communication protocol. Furthermore, the wireless communication may include, for example, the local area network 264. The local area network 264 may include at least one of, for example, WI-FI®, BLUETOOTH®, a near field communication (NFC), a magnetic secure transmission (MST), or a global navigation satellite system (GNSS).

The MST may generate a pulse based on transmission data by using an electromagnetic signal, and the pulse may generate a magnetic field signal. The electronic device 201 may send the magnetic field signal to point of sale (POS). The POS may detect the magnetic field signal using a MST reader and may recover the data by converting the detected magnetic field signal to an electrical signal.

The GNSS may include at least one of a global positioning system (GPS), a global navigation satellite system (GLONASS), a Beidou Navigation Satellite System (hereinafter referred to as "BEIDOU"), or a European global satellite-based navigation system (GALILEO). Hereinafter, "GPS" and "GNSS" may be used interchangeably in this disclosure. The wired communication may include at least one of, for example, a universal serial bus (USB), a high definition multimedia interface (HDMI), a recommended standard-232 (RS-232), a plain old telephone service (POTS), or the like. The network 262 may include at least one of telecommunications networks, for example, a computer network (e.g., LAN or WAN), an Internet, or a telephone network.

The input device 270 may include various examples of an interface for interfacing the user with the electronic device 201. For example, the input device 270 may include a physical button, a touch screen included in the display 220, an external input device (e.g., a wireless/wired keyboard or a mouse) connected through the input/output interface 250 or the communication circuit 260, and the like.

The processor 280 may be operatively connected with at least one other element(s) of, for example, the electronic device 201 and may perform, for example, data processing or an operation associated with control or communication of at least one other element(s) of the electronic device 201. The processor 280 may include one or more of, for example, a central processing unit (CPU), an application processor (AP), or a communication processor (CP).

According to an embodiment, the processor 280 may execute the first application, which manages the first account, to obtain the user information for verifying or creating the first account through the input device 270. For example, the user information for verifying the first account may include an ID of the first account and a password of the first account. As another example, the user information for creating the first account may include the ID of the first account, the password of the first account, a name of the user, date of birth, an email address, a telephone number, or a combination thereof.

According to an embodiment, the processor 280 may verify or create the first account through interaction with the first server 204 based on the user information.

According to an embodiment, the processor 280 may execute the second application that manages the second account, in response to a specified event. For example, the specified event may correspond to an event for agreeing to create the second account based on at least a portion of the user information used to verify or create the first account. The specified event may be received through a UI screen output in, for example, the display 220.

If the second application is executed, the processor 280 may create the second account through interaction with the second server 206 based on the at least a portion of the user information. The at least a portion of the user information used to create the second account may include at least one of, for example, the email address or the telephone number.

According to an embodiment, when the first account is verified or created, the at least a portion of the user information used to create the second account may be stored in the memory 230. That is, if the user information is obtained to verify or create the first account, the processor 280 may store the at least a portion of the user information in the memory 230 and may use the at least a portion of the user information stored in the memory 230 to create the second account.

For example, the processor 280 may read the at least a portion of the user information from the memory 230 in response to the specified event to provide the second application with the at least a portion of the user information. The processor 280 may create the second account through the interaction with the second server 206 associated with the second application.

Figure 3:
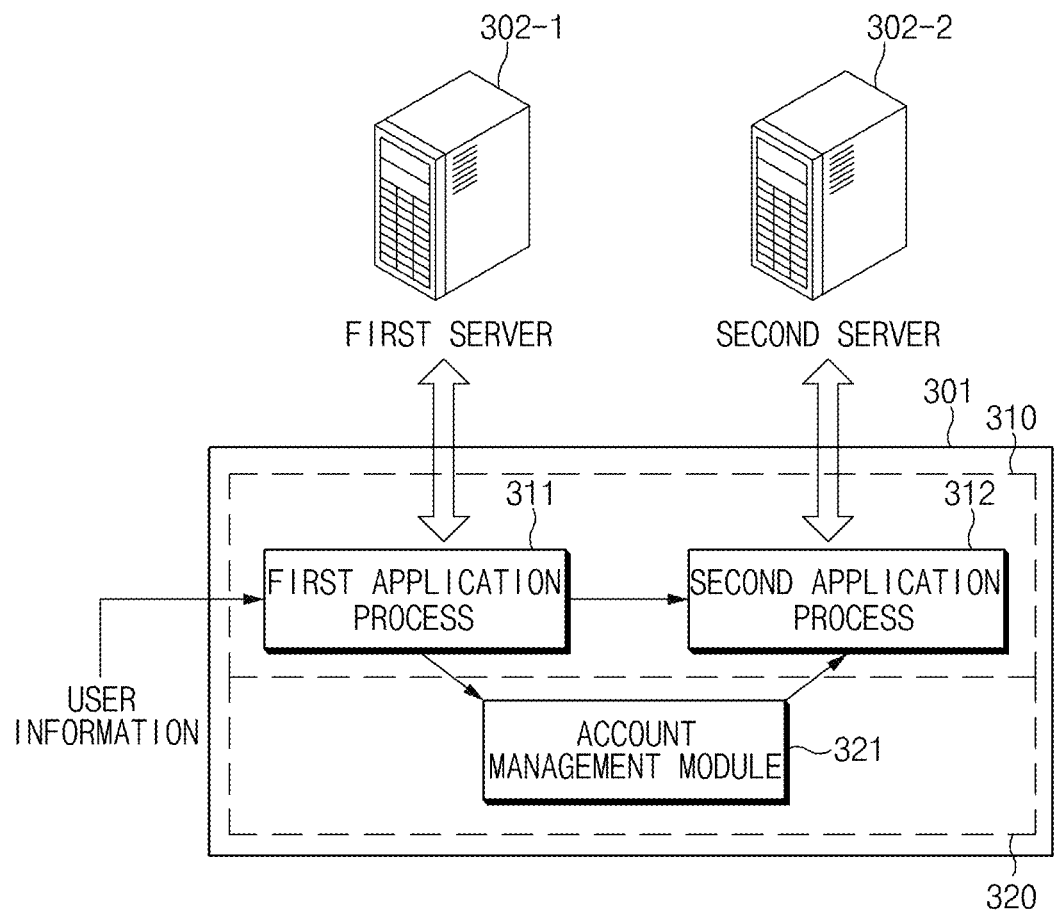
FIG. 3 is a drawing for describing a method for creating a service account, according to an embodiment of this disclosure.

According to another embodiment, the at least a portion of the user information used to create the second account may be set to be directly provided to the process of the second application through inter-process communication (IPC) (refer to FIG. 3).

An operation of the above-described processor 280 is not limited to the above-mentioned description as an example. For example, it is understood that the operation of the processor described in another part of this disclosure is the operation of the processor 280. In addition, in this disclosure, it is understood that at least some of operations described as operations of the electronic device 201 are operations of the processor 280.

Meanwhile, the external electronic device 202 may be a device of which the type is the same as or different from that of the electronic device 201. According to an embodiment, each of the first server 204 and the second server 206 may include a group of one or more servers. According to various embodiments, all or a part of operations that the electronic device 201 will perform may be executed by another or plural electronic devices (e.g., the electronic device 202 and the servers 204 and 206).

According to an embodiment, in the case where the electronic device 201 executes any function or service automatically or in response to a request, the electronic device 201 may not perform the function or the service internally, but, alternatively additionally, it may request at least a part of a function associated with the electronic device 201 from another device (e.g., the electronic device 202 or the server 204 or 206). Another electronic device (e.g., the electronic device 202 or the server 204 or 206) may execute the requested function or additional function and may transmit the execution result to the electronic device 201. The electronic device 201 may provide the requested function or service using the received result or may additionally process the received result to provide the requested function or service. To this end, for example, cloud computing, distributed computing, or client-server computing may be used.

FIG. 3 illustrates a method for creating a service account, according to an embodiment of this disclosure.

For example, a processor (e.g., the processor 280 of FIG. 2) of an electronic device may load a first application process 311 and a second application process 312 into a memory by executing a first application and a second application.

The first application process 311 and the second application process 312 may be implemented on, for example, an application layer 310 of an electronic device 301 as a software configuration, which is implemented by a processor. In the following description, an operation of each of the processes 311 and 312 may be understood as an operation of a processor.

According to an embodiment, the processor of the electronic device may activate the first application process 311 by executing the first application. A user may enter user information through a UI screen output by the first application process 311. The first application process 311 may verify or create a first account through interaction with a first server 302-1 based on the user information.

For example, the first application process 311 may receive an ID and a password (an example of the user information) of the first account from the user to perform a verification process (e.g., log in or sign in) of the first account. As another example, the first application process 311 may receive an ID, a password, a name, and/or agreement to the terms and conditions (an example of the user information) to perform a creation process (e.g., creating account and sign up) of the first account. In this case, the first server 302-1 may verify or create the first account through interaction with the first application process 311. As a result, the first server 302-1 may issue a verification token of the first account and may provide the electronic device 301 with the verification token of the first account.

If the first account is verified or created, a processor of the electronic device 301 may activate the second application process 312 may call an activity screen (e.g., a UI screen) by the second application process 312 and may output the activity screen in a display. For example, if the first account is verified or created, a setup wizard (not illustrated) may recognize the verification or the creation of the first account. If the first account is verified or created, the second application process 312 may be activated under arbitration of the setup wizard (not illustrated). For example, a notice for asking whether to create a second account based on the first account, and/or terms and conditions associated with creation of the second account may be included in the activity screen.

If a specified event is received through the activity screen output by the second application process 312, the processor may send at least a portion of the user information (e.g., information needed to create the second account, for example, an email, a telephone number, an ID of the first account, a name, date of birth, or the like), which is used to verify or create the first account, from the first application process 311 to the second application process 312 in response to the specified event. For example, the specified event may correspond to an event for agreeing to create the second account based on the first account. The first application process 311 may send the at least a portion of the user information to the second application process 312 through various paths in response to the specified event.

For example, the first application process 311 may send the at least a portion of the user information (i.e., the user information to be used to create the second account), which is used to verify or create the first account, to an account management module 321 (e.g., an account manager in a platform) implemented in a framework layer 320. The account management module 321 may provide the at least a portion of the user information to the second application process 312 in response to a request of the second application process 312. For example, the first application process 311 may store the at least a portion of the user information, which is used for the first account, in a shared memory of the account management module 321. The second application process 312 may read the at least a portion of the user information from the shared memory of the account management module 321 to create the second account.

As another example, the first application process 311 may directly send the at least a portion of the user information (i.e., the user information to be used to create the second account), which is used to verify or create the first account, to the second application process 312. For example, the first application process 311 may provide the at least a portion of the user information to the second application process 312 through IPC.

The second application process 312 may create the second account through interaction with a second server 302-2 based on information (i.e., the user information to be used to create the second account) received from the first application process 311. For example, the second application process 312 may send the at least a portion of the user information, which is received from the first application process 311, to the second server 302-2. In this case, the second server 302-2 may create the second account through interaction with the second application process 312. As the created result, the second server 302-2 may issue a verification token of the second account and may provide the electronic device 301 with the verification token of the second account.

According to an embodiment, at least an email address or a telephone number may be included in information received from the first application process 311. In this case, in the creation of the second account, the second server 302-2 may designate the email address or the telephone number, which is received from the second application process 312, as identification information (e.g., an ID) of the second account.

Also, according to an embodiment, in the creation of the second account, the second server 302-2 may randomly create a password of the second account. The second server 302-2 may send the randomly created password to the email address or the telephone number received from the second application process 312.

For example, the randomly created password of the second account may be included in a specified message and may be sent through an email, SMS/MMS, an IM service, or the like. A notice for resetting a password, additional information (e.g., a request for agreement to additional terms and conditions, policies, and sharing of marketing information with a third-party) about the second account, a related link, and the like as well as the password may be further included in the specified message, in which the password of the second account is included. That is, the second server 302-2 may allow the user of the electronic device 301 to rapidly create a service account by randomly creating the password of the second account and postponing resetting the password of the second account.

According to various embodiments, the second server 302-2 may additionally perform a process for verifying validity of the user information (or the first account) used to create the second account. For example, when the first account is created, the first server 302-1 may separately generate an account verification code (or a key) and may send the account verification code to the first application process 311 of the electronic device 301. The first application process 311 may send the account verification code to the second application process 312. When the second account is created, the second server 302-2 may receive the account verification code from the second application process 312 to verify the validity of the first account, on which the creation of the second account is based, through an API provided by the first server 302-1.

Figure 4:
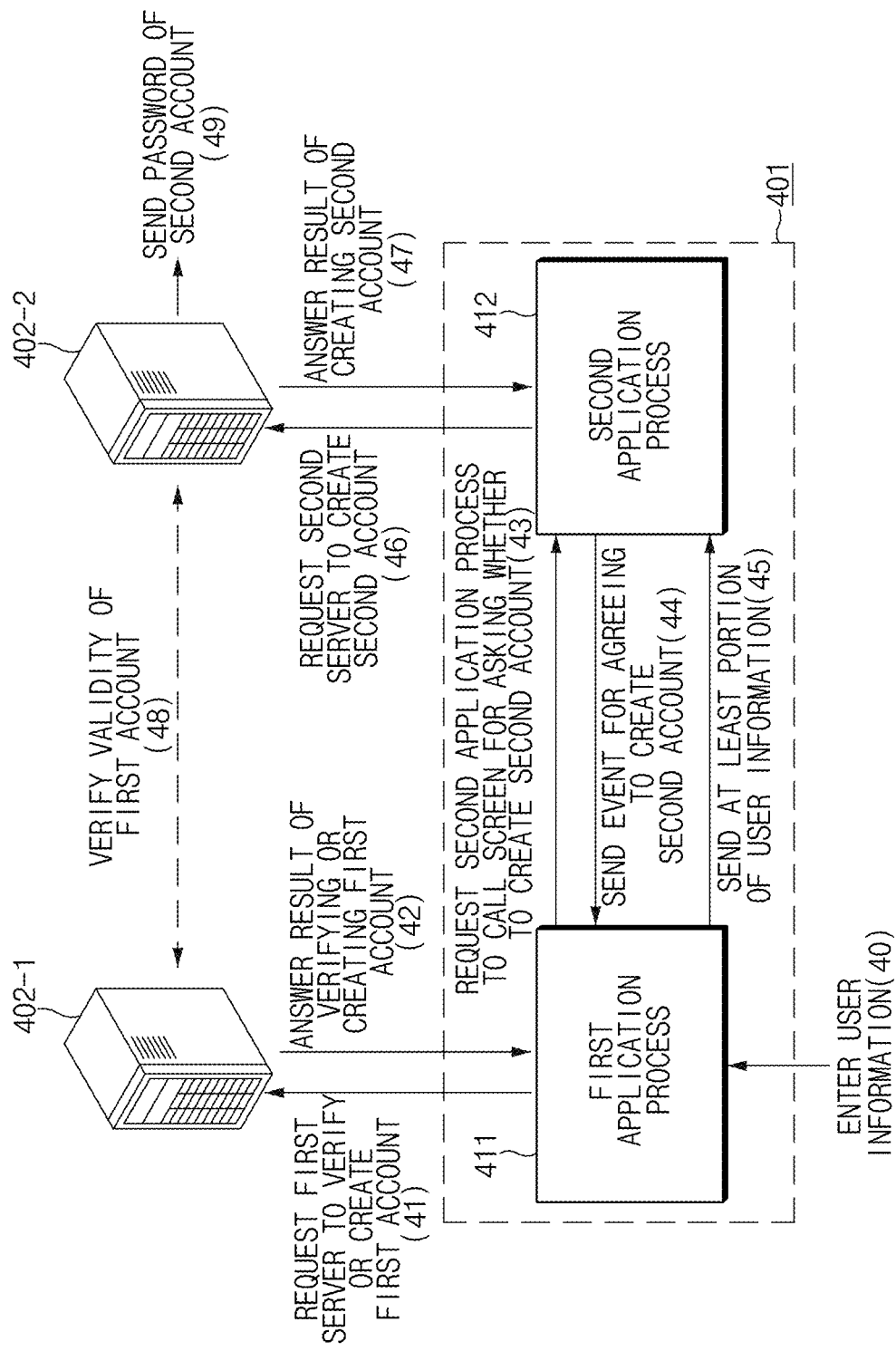
FIG. 4 is a drawing for describing a method for creating a service account, according to an embodiment.

FIG. 4 illustrates a method for creating a service account, according to an embodiment.

At least a part of elements of an electronic device 401 illustrated in FIG. 4 may correspond to at least a part of elements of the electronic device 301 illustrated in FIG. 3. For example, the electronic device 401 may correspond to the electronic device 301 of FIG. 3. A first application process 411 may correspond to the first application process 311 of FIG. 3. A second application process 412 may correspond to the second application process 312 of FIG. 3. Also, a first server 402-1 and a second server 402-2 may correspond to the first server 302-1 and the second server 302-2 of FIG. 3, respectively. A duplicated description about an element corresponding to each of the elements of FIG. 3 is not repeated here.

In operation 40, a user may enter user information based on the first application process 411 of the electronic device 401. For example, the user may enter the user information through a UI screen output by the first application process 411.

In operation 41, the first application process 411 may request the first server 402-1 to verify or create a first account. For example, when the first application process 411 requests the first server 402-1 to verify the first account, the first application process 411 may send an ID and a password of the first account (an example of the user information), which are received from the user, to the first server 402-1. As another example, when the first application process 411 requests the first server 402-1 to create the first account, the first application process 411 may send the ID, the password, a name, and/or agreement to the terms and conditions (an example of the user information), which are received from the user, to the first server 402-1.

In operation 42, the first server 402-1 may verify or create the first account based on the user information received from the first application process 411. According to an embodiment, when the first server 402-1 creates the first account to create an account of high reliability, the first server 402-1 may perform user verification and/or validity verification through an email address, a telephone number, or the like. While the first server 402-1 answers the result of verifying or creating the first account, the first server 402-1 may issue a verification token of the first account and may provide the first application process 411 with the verification token.

In operation 43, if the first account is verified or created, the first application process 411 may request the second application process 412 to call a UI screen for asking whether to create a second account. For example, a notice for asking whether to create the second account based on the first account, and/or terms and conditions associated with creation of the second account, or the like may be included in the UI screen. The second application process 412 may output the UI screen in response to the request to receive a specified event from the user through the UI screen. For example, the specified event may correspond to a touch input for agreeing to create the second account based on the first account.

In operation 44, the second application process 412 may send the specified event (i.e., an event for agreeing to create the second account based on the first account), which is received through the UI screen, to the first application process 411.

In operation 45, if the first application process 411 receives the specified event, the first application process 411 may send at least a portion of the user information (e.g., information, which is needed to create the second account, such as an email, a telephone number, an ID of the first account, a name, date of birth, or the like), which is used to verify or create the first account, from the first application process 411 to the second application process 412 in response to the specified event. According to various embodiments, the at least a portion of the user information (e.g., information, which is needed to create the second account, such as an email, a telephone number, an ID of the first account, a name, date of birth, or the like) used to verify or create the first account may be sent in above-mentioned operation 43 in advance.

According to an embodiment, the first application process 411 may send the at least a portion of the user information, which is used to verify or create the first account, to the second application process 412 through various paths. For example, the first application process 411 may send the at least a portion of the user information (i.e., the user information to be used to create the second account), which is used to verify or create the first account, to the second application process 412 through an account management module (e.g., an account manager in a platform) implemented in a framework layer. As another example, the first application process 411 may directly send the at least a portion of the user information (i.e., the user information to be used to create the second account), which is used to verify or create the first account, to the second application process 412 through IPC.

In operation 46, the second application process 412 may request the second server 402-2 to create the second account. For example, when the second application process 412 requests the second server 402-2 to create the second account, the second application process 412 may send information (i.e., the user information to be used to create the second account), which is received from the first application process 411, to the second server 402-2.

In operation 47, the second server 402-2 may create the second account based on the user information received from the second application process 412. In this case, while the second server 402-2 answers the result of verifying or creating the second account, the second server 402-2 may issue a verification token of the second account and may provide the second application process 412 with the verification token.

According to an embodiment, at least an email address or a telephone number may be included in the user information that the second server 402-2 receives from the second application process 412. In this case, in the creation of the second account, the second server 402-2 may designate the email address or the telephone number, which is received from the second application process 412, as identification information (e.g., an ID) of the second account. In addition, for example, in the creation of the second account, the second server 402-2 may randomly create a password and may allocate the password to the second account. For example, in the case where the user verification and/or the validity verification is made when the first account is created, the second server 402-2 may omit the user verification and/or the validity verification on the second account since the second server 402-2 trusts validity of the first account.

In operation 48, the second server 402-2 may verify the validity of the user information (or the first account) used to create the second account. According to various embodiments, operation 48 may be executed before operation 47 or may be omitted.

For example, in operation 42, the first server 402-1 may separately generate an account verification code (or a key) and may send the account verification code to the first application process 411 of the electronic device 401. In operation 45, the first application process 411 may send the account verification code to the second application process 412. In operation 46, the second server 402-2 may receive the account verification code from the second application process 412. In operation 48, the second server 402-2 may verify the validity of the first account, on which the creation of the second account is based, through an API provided by the first server 402-1.

In operation 49, the second server 402-2 may send the randomly created password to the email address or the telephone number received from the second application process 412. For example, the randomly created password of the second account may be included in a specified message and may be sent through an email, SMS/MMS, an IM service, or the like. A notice for resetting a password, additional information about the second account, a related link, and the like as well as the password may be further included in the specified message in which the password of the second account is included. That is, the second server 402-2 may allow the user of the electronic device 401 to rapidly create a service account by randomly creating the password of the second account and postponing resetting the password of the second account.

Figure 5:
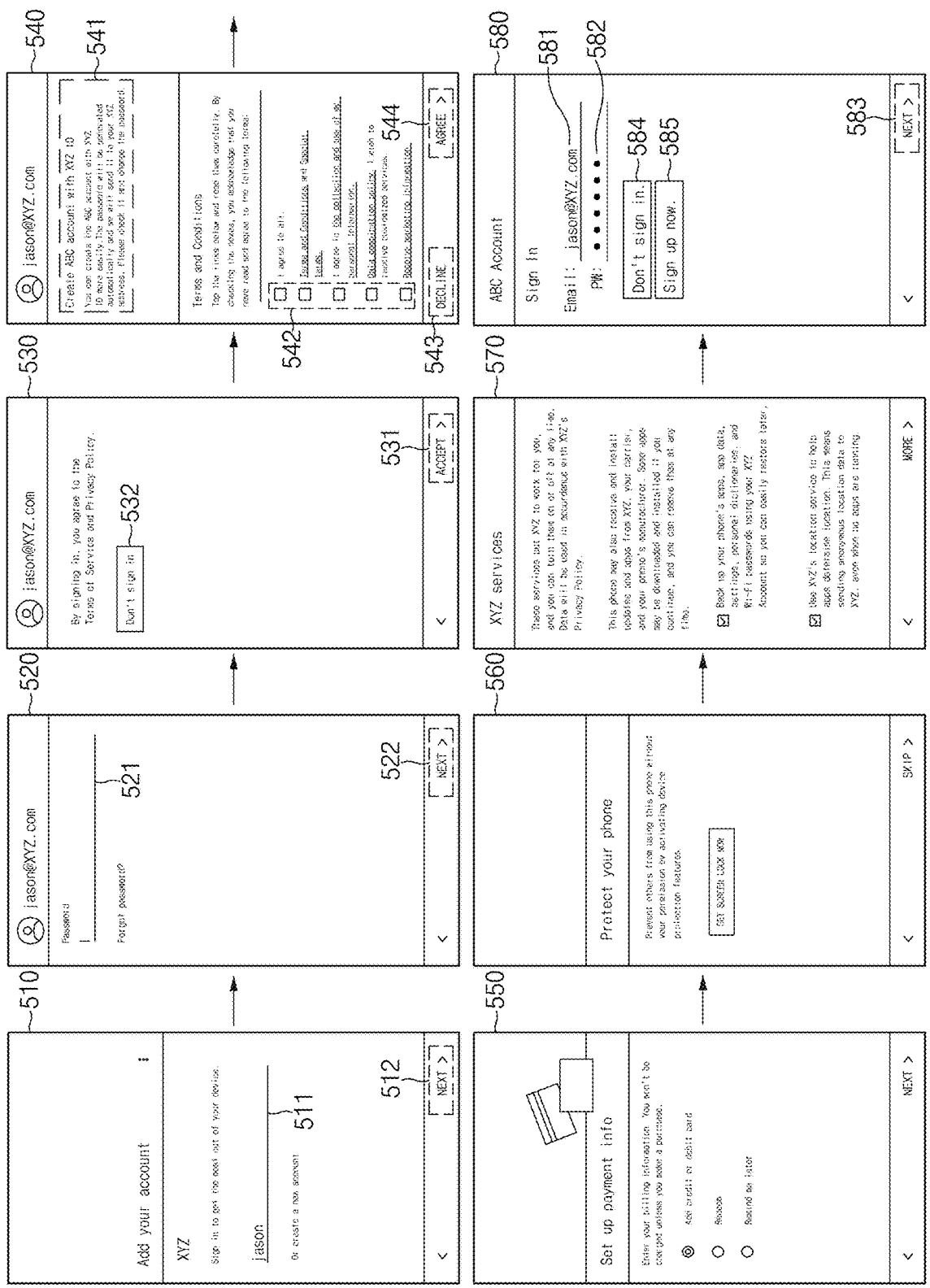
FIG. 5 illustrates a screen for describing a method for creating a service account, according to another embodiment.

FIG. 5 illustrates a screen for describing a method for creating a service account, according to an embodiment.

Referring to FIG. 5, various screens 510 to 580 that are capable of being output in a display of an electronic device are illustrated. The screens 510 to 580 illustrate a process of creating an ABC service account (a second account) based on verification of a XYZ service account (a first account).

For example, various UI objects for guiding verification or creation of the XYZ service account may be included in the screen 510. For example, the screen 510 may correspond to a screen output by an activity of a XYZ service account managing application (process). According to an embodiment, an input field 511 for entering an ID of the XYZ service account, a page link for creating a new XYZ service account, and the like may be included in the screen 510. For example, a user that already has the XYZ service account may enter an ID (an example of user information: "jason" in the case of the screen 510) of the XYZ service account, which the user has, in the input field 511 and may select a button 512. If the button 512 is selected, the screen 520 may be output in the display.

For example, a password input field 521 for verifying the XYZ service account, a page link for finding out a forgotten password, and the like may be included in the screen 520. For example, the user may enter a password corresponding to the ID of the XYZ service account in the input field 521 and may select a button 522. If the button 522 is selected, the screen 530 may be output in the display. Likewise, the screen 520 may be a screen output by an activity of the XYZ service account managing application (process) (refer to operation 40 of FIG. 4).

A notice for obtaining agreement to terms and conditions and/or policies associated with a XYZ service may be output in the screen 530. For example, in the case where the user agrees to the terms and conditions and/or the policies associated with the XYZ service, the user may select a button 531. Otherwise, the user may select a button 532. If the button 531 is selected, the electronic device may verify the XYZ service account of the user through interaction with a XYZ service account server (a first server) (refer to operation 41 and operation 42). If the verification is successful, the electronic device may output the screen 540 in the display. As in the screen 520, the screen 530 may be a screen output by an activity of the XYZ service account managing application (process).

The screen 540 may correspond to a screen output by an activity of, for example, the ABC service account managing application. For example, if the UI object 531 of the screen 530 is selected, the XYZ service account managing application (a process of the XYZ service account managing application) may call the screen 540 from the ABC service account managing application (a process of the XYZ service account managing application) (refer to operation 43). That is, the screen 540 output by the ABC service account managing application (a process of the ABC service account managing application) may be output in the display in response to the call.

According to an embodiment, the screen 540 may include a notice 541 for asking the user whether to agree to create the ABC service account based on the XYZ service account, a plurality of check boxes (or a tick box) 542 for agreeing to terms and conditions and/or policies associated with the ABC service, a UI object 543 for declining creating the ABC service account, and/or a UI object 544 for agreeing to create an ABC service account.

For example, the user may perform an event for agreeing to create the ABC service account based on the XYZ service account. For example, the user may check the plurality of check boxes 542 for agreeing to terms and conditions and/or policies associated with an ABC service and may select the UI object 544 for agreeing to create of the ABC service account.

If the event is received, the ABC service account managing application (a process of the ABC service account managing application) may receive at least a portion of the user information from the XYZ service account managing application (a process of the XYZ service account managing application) that was entered in the screens 510 and 520 (refer to operation 44 and operation 45). For example, the ABC service account managing application (a process of the ABC service account managing application) may receive identification information (e.g., "jason@XYZ.com") of the XYZ service account of the user. Next, the ABC service account managing application (a process of the ABC service account managing application) may create the ABC service account through interaction with the ABC service account managing server (a second server) based on the identification information (e.g., "jason@XYZ.com") of the XYZ service account (refer to operation 46 and operation 47). In this case, the ABC service account managing server may designate the identification information (e.g., "jason@XYZ.com") of the XYZ service account as an ID of the ABC service account. In addition, the ABC service account managing server may randomly create a password of the ABC service account to send the password to the "jason@XYZ.com" (refer to operation 49). This may mean that the ABC service account of the user is created based on the XYZ service account.

For example, the screens 550 to 570 may be sequentially output after the UI object 544 of the screen 540 is selected.

Each of the screens 550 to 570 may be a screen output by an activity of the XYZ service account managing application (process). According to an embodiment, each of the screens 550 to 570 may be a UI screen for setting up an additional service item after the XYZ service account is verified. For example, UI objects for setting up a payment means may be included in the screen 550, and UI objects for security settings of the electronic device may be included in the screen 560. Furthermore, UI objects for backing the electronic device up and settings location information may be included in the screen 570. According to various embodiments, all or a part of the screens 550 to 570 may be omitted. According to another embodiment, for convenience of the user, the screen 540 may be output after the screens 550 to 570.

The screen 580 may correspond to a screen for independently verifying or creating the ABC service account. For example, in the case where the user does not agree to create the ABC service account based on the XYZ service account in the screen 540 (e.g., in the case where the user selects the UI object 543 in the screen 540), the screen 580 may be output in the display. The screen 580 may be a screen output by an activity of the ABC service account managing application (process). The screen 580 may be output after settings of the XYZ service account are completed through, for example, the screens 550 to 570 or after the screen 540.

For example, an input field 581 for entering the ID of the ABC service account, an input field 582 for entering the password of the ABC service account, a UI object 583 for proceeding to verification of the ABC service account, a UI object 584 for declining verification of the ABC service account, and a UI object 585 for proceeding to creation of the ABC service account may be included in the screen 580.

For example, in the case where the user has the ABC service account, the user may use an ABC service by respectively entering an ID and a password of the user in the ID input field 581 and the password input field 582 and selecting the UI object 583 for proceeding to verification of the ABC service account. In the case where the user does not want to use the ABC service, the user may select the UI object 584 for declining verification of the ABC service account. Also, for example, if the user does not have the ABC service account, the user may separately create an ABC account, which is independent of the XYZ service account, by selecting the UI object 585 for proceeding to creation of the ABC service account.

Figure 6:
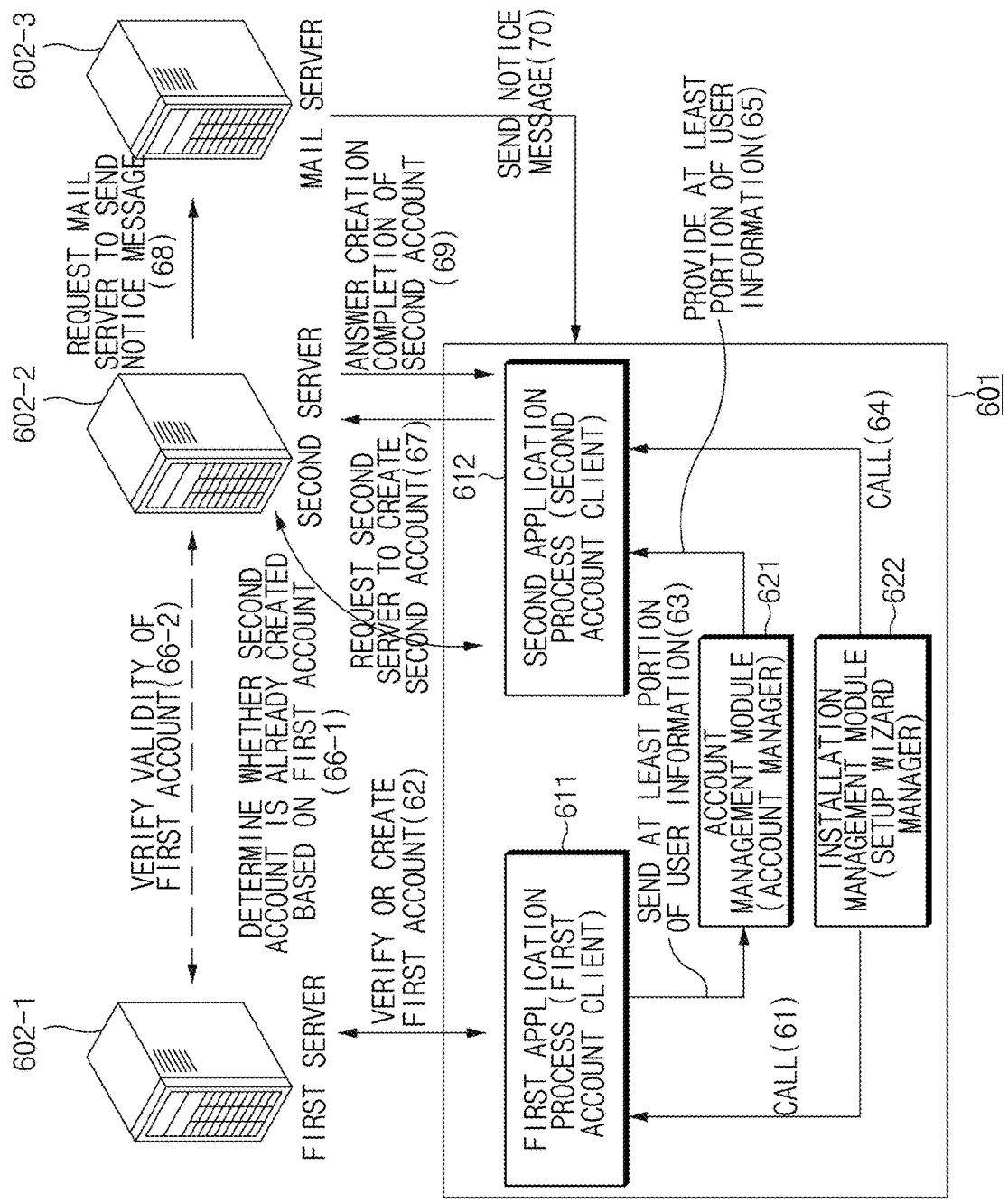
FIG. 6 is a drawing for describing a method for creating a service account, according to another embodiment.

FIG. 6 illustrates a method for creating a service account, according to another embodiment.

At least a part of elements of an electronic device 601 illustrated in FIG. 6 may correspond to at least a part of elements of the electronic device 301 illustrated in FIG. 3. For example, a first application process 611 may correspond to the first application process 311 of FIG. 3. A second application process 612 may correspond to the second application process 312 of FIG. 3. An account management module 621 may correspond to the account management module 321 of FIG. 3. Also, a first server 602-1 and a second server 602-2 may correspond to the first server 302-1 and the second server 302-2 of FIG. 3, respectively. A duplicated description about an element corresponding to each of the elements in FIG. 3 is not repeated here.

In operation 61, an installation management module (e.g., a setup wizard manager) 622 of the electronic device 601 may call the first application process (a first account client) 611 to verify (e.g., log in or sign in) and create a first account. The first application process 611 may be activated in response to the call, and the user may enter the user information through a UI screen output by the first application process 611.

In operation 62, the first application process 611 may verify (e.g., log in or sign in) or create the first account through interaction with the first server 602-1 based on the user information.

For example, the first application process 611 may receive an ID and a password of the first account (an example of the user information) from the user to verify (e.g., log in or sign in) the first account through the interaction with the first server 602-1.

As another example, the first application process 611 may receive an ID, a password, a name, and/or agreement to the terms and conditions (an example of the user information) to create the first account (e.g., creating account and sign up).

In operation 63, if the first account is verified or created, the first application process 611 may send at least a portion of the user information (e.g., information, which is needed to create the second account, such as an email, a telephone number, an ID of the first account, a name, date of birth, or the like), which is used to verify or create the first account, to the account management module (an account manager) 621.

In operation 64, if the first account is verified or created, the installation management module 622 may recognize verification or creation of the first account. If the installation management module 622 recognizes the verification or the creation of the first account, the installation management module 622 may call (or activate) the second application process 612, and the second application process 612 may output a UI screen for creating the second account in a display.

In operation 65, the account management module 621 may provide the at least a portion of the user information (e.g., information, which is needed to create the second account, such as an email, a telephone number, the ID of the first account, a name, date of birth, or the like), which is used to verify or create the first account, to the second application process 612.

In operation 66-1, the second application process 612 may determine whether the second account based on the first account is already created in the second server 602-2, based on information received from the account management module 621. This is to prevent the second account from being redundantly created. Furthermore, according to various embodiments, in operation 66-2, the second server 602-2 may additionally verify (or check) validity of the user information (or the first account), which is used to create the second account, with the first server 602-1 (i.e., operation 66-2 is optional). In the case where the second account based on the first account is already created in the second server 602-2, the second application process 612 may output a UI screen for verifying (e.g., log in or sign in) the second account. On the other hand, in the case where the second account based on the first account is not created in the second server 602-2, the second application process 612 may output a UI screen for creating the second account and may perform operation 67 to operation 70.

In operation 67, the second application process 612 may request the second server 602-2 to create the second account. For example, when the second application process 612 requests the second server 602-2 to create the second account, the second application process 612 may send information (i.e., the user information to be used to create the second account), which is received from the first application process 611, to the second server 602-2. The second server 602-2 may proceed to a creation process of the second account based on the information.

For example, at least an email address or a telephone number (corresponding to the first account) may be included in the user information that the second server 602-2 receives from the second application process 612. In this case, in the creation of the second account, the second server 602-2 may designate the email address or the telephone number, which is received from the second application process 612, as identification information (e.g., an ID) of the second account. In addition, for example, in the creation of the second account, the second server 602-2 may randomly create a password and may allocate the password to the second account.

In operation 68, if the second account is created, the second server 602-2 may request a mail server 602-3 to send a specific notice message. For example, the randomly created password of the second account, a notice for resetting a password, additional information (e.g., terms and conditions or the like) about the second account, and/or a related link may be included in the notice message. Moreover, a destination of the notice message may be specified by using the email address or the telephone number that is designated as identification information (e.g., an ID) of the second account.

In operation 69, the second server 602-2 may answer the creation result of the second account to the electronic device 601. Afterwards, the second application process 612 may complete a creation or verification process of the second account. For example, if the creation or the verification of the second account is completed, the second application process 612 may output a UI screen for providing notification of completion of the creation or the verification of the second account in the display.

In operation 70, the mail server 602-3 may send a notice message, which the second server 602-2 requests in operation 68, to the destination specified by the second server 602-2. The mail server 602-3 is illustrated in FIG. 6. However, an embodiment of this disclosure is not limited thereto. For example, in the case where the destination of the notice message is specified by using a telephone number, the mail server 602-3 may be replaced with a server or the like that manages a cellular network.

Figure 7:
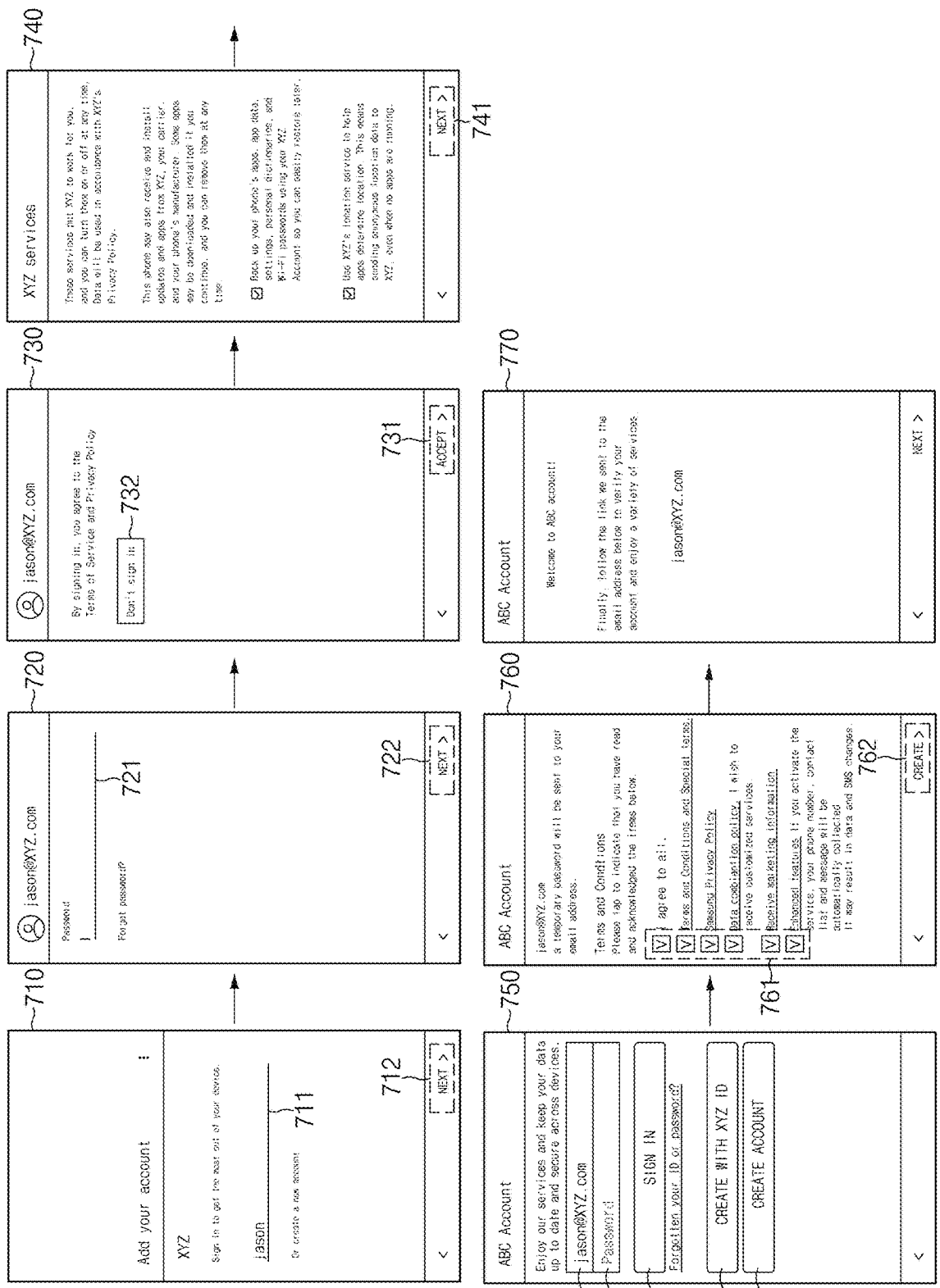
FIG. 7 illustrates a screen for describing a method for creating a service account, according to another embodiment.

FIG. 7 illustrates a screen for describing a method for creating a service account, according to another embodiment.

Referring to FIG. 7, various screens 710 to 770 that are capable of being output in a display of an electronic device are illustrated. The screens 710 to 770 illustrate a process of creating an ABC service account (a second account) based on verification of a XYZ service account (a first account). In the description of FIG. 7, the descriptions duplicated with the description of FIG. 5 may not be repeated here.

For example, various UI objects for guiding verification or creation of the XYZ service account may be included in the screen 710 (refer to operation 61 of FIG. 6). According to an embodiment, an input field 711 for entering an ID of the XYZ service account, a page link for creating a new XYZ service account, and the like may be included in the screen 710. For example, a user that already has the XYZ service account may enter an ID (an example of user information: "jason" in the case of the screen 710) of the XYZ service account, which the user has, in the input field 711 and may select a button 712. If the button 712 is selected, the screen 720 may be output in the display.

For example, a password input field 721 for verifying (e.g., log in or sign in) the XYZ service account, a page link for finding out a forgotten password, or the like may be included in the screen 720. For example, the user may enter a password corresponding to the ID of the XYZ service account in the input field 721 and may select a button 722. If the button 722 is selected, the screen 730 may be output in the display.

A notice for obtaining agreement to terms and conditions and/or policies associated with a XYZ service may be output in the screen 730. For example, in the case where the user agrees to the terms and conditions and/or the policies associated with the XYZ service, the user may select a button 731. Otherwise, the user may select a button 732. If the button 731 is selected, the electronic device may verify the XYZ service account of the user through interaction with a XYZ service account managing server (a first server) (refer to operation 62 of FIG. 6). If the verification is successful, the electronic device may output the screen 740 in the display.

UI objects for a backup provided by the XYZ service and settings of location information may be included in the screen 740. The screen 740 may correspond to a UI screen for setting up an additional service item after the XYZ service account is verified. According to various embodiments, before the screen 740 or after the screen 740, the screen 550 for setting up a payment means and the screen 560 for security settings of the electronic device that are illustrated in FIG. 5 may be additionally and sequentially output in the display.

The verification (or creation) of the XYZ service account may be completed through the screens 710 to 740. If the verification of the XYZ service account is completed, at least a portion of the user information (e.g., an email address of the XYZ service ("jason@XYZ.com")) used to verify the XYZ service account may be provided to an account manager (refer to operation 63 of FIG. 6). If a button 741 is selected by the user, the screen 750 may be output at the same time when the verification of the XYZ service account is completed (refer to operation 64 of FIG. 6).

The screen 750 may include an ID input field 751 for entering an ID of the ABC service account, a password input field 752, a button 753 for verifying (sign in) the ABC service account, a button 755 for creating the ABC service account based on (or depending on) the XYZ service account, and a button 757 for independently creating the XYZ service account.

The screen 750 may correspond to a screen output by the ABC service account application process. According to an embodiment, the ABC service account application process may receive an email address ("jason@XYZ.com") of an XYZ service, which is used to verify the XYZ service account, from an account manager while the screen 750 is output in the display (refer to operation 65 of FIG. 6).

According to an embodiment, in the case where the user separately has the ABC service account, the user may respectively enter the ID and the password of the ABC service account in the ID input field 751 and the password input field 752 and may select the button 753. In this case, the email address ("jason@XYZ.com") that is received from the XYZ service account application process through the account manager may be output in the ID input field 751 in advance.

According to another embodiment, in the case where the user does not have the ABC service account, the user may select the button 757 for independently creating the ABC service account. A new screen (not illustrated) for creating the ABC service account may be output in response to the selection of the button 757.

According to another embodiment, in the case where the user does not have the ABC service account, the user may select the button 755 for creating the ABC service account based on the XYZ service account. The screen 760 may be output in response to the selection of the button 755. In this case, the electronic device may determine whether the user has the ABC service account, which is based on the XYZ service account, through interaction with the ABC service account server in response to the selection of the button 755 (refer to operation 66-1 of FIG. 6).

A plurality of check boxes 761 for agreeing to terms and conditions and/or policies associated with an ABC service, and a button 762 for agreeing to create the ABC service account may be included in the screen 760. Also, a notice indicating that the randomly created temporary password is sent to an email address ("jason@XYZ.com") of an XYZ service may be included in the screen 760.

The user may select (check) all the plurality of check boxes 761 and may select the button 762 for agreeing to create the ABC service account. The ABC service account application process of the electronic device may request the ABC service account managing server (a second server) to create the ABC service account, which is based on the XYZ service account, in response to the selection of the button 762 (refer to operation 67 of FIG. 6). The email address ("jason@XYZ.com") that is received from the XYZ service account application process through an account manager may be included in the request.

According to an embodiment, the ABC service account managing server (the second server) may create the ABC service account based on the email address ("jason@XYZ.com") in response to the request. In this case, the ABC service account managing server may designate the email address ("jason@XYZ.com") as an ID of the ABC service account. In addition, the ABC service account managing server may randomly create a password of the ABC service account and may send the password to the email address ("jason@XYZ.com") through a mail server (refer to operation 68 to operation 70). This may mean that the ABC service account of the user is created based on the XYZ service account.

Meanwhile, if a response indicating that creation of the ABC service account is completed is received from the ABC service account managing server, the ABC service account application process may output the screen 770 in the display. A text indicating that a specific notice message is sent to an XYZ service email address ("jason@XYZ.com") designated as the ID of the ABC service account may be output in the screen 770.

Figure 8:
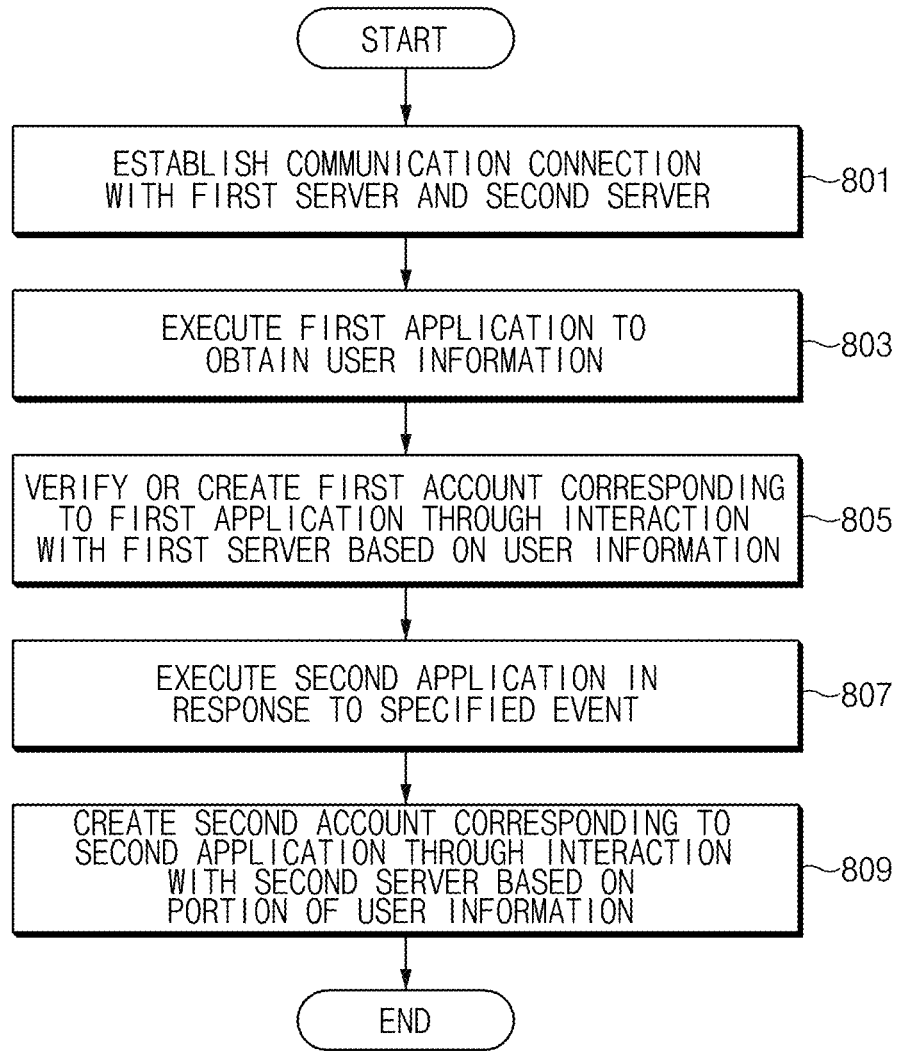
FIG. 8 illustrates a flowchart of a service account creating method of an electronic device according to an embodiment.

FIG. 8 illustrates a flowchart of a service account creating method of an electronic device, according to an embodiment.

Referring to FIG. 8, according to an embodiment, a method for creating a service account may include operation 801 to operation 809. Operation 801 to operation 809 may be executed by, for example, the electronic device 201 (e.g., the processor 280) illustrated in FIG. 2. For example, each operation in operation 801 to operation 809 may be implemented with instructions that are performed (or executed) by the processor 280 of the electronic device 201. The instructions may be stored in, for example, the memory 230 of the electronic device 201. Hereinafter, operation 801 to operation 809 may be described by using the reference numeral of FIG. 2.

In operation 801, the electronic device 201 may establish a communication connection with the first server 204 and the second server 206 through the communication circuit 260. For example, the first server 204 and the second server 206 may respectively operate in conjunction with a first application and a second application that are executable in the electronic device 201. The first application and the second application may correspond to service account managing applications that manage a first account and a second account of a user, respectively.

In operation 803, the electronic device 201 may execute the first application to obtain user information. For example, the electronic device 201 may obtain the user information (e.g., a name, date of birth, an email address, a telephone number, or a combination thereof) for verifying or creating the first account through a UI screen output by the first application.

In operation 805, the electronic device 201 may verify or create the first account through interaction with the first server 204, based on the user information obtained in operation 803.

In operation 807, the electronic device 201 may execute the second application in response to a specified event. For example, the specified event may correspond to an event (i.e., an event for agreeing to create the second account based on the first account) for agreeing to create the second account, based on at least a portion of the user information used to verify or create the first account.

In operation 809, the electronic device 201 may create the second account through interaction with the second server 206, based on the at least a portion of the user information used to verify or create the first account. According to an embodiment, the user information (i.e., the at least a portion of the user information used to verify or create the first account) used to create the second account may include at least one of an email address or a telephone number.

According to an embodiment, when the first account is verified or created, the user information (i.e., the at least a portion of the user information used to verify or create the first account) used to create the second account may be stored in the memory 230. When the processor 280 of the electronic device 201 creates the second account in response to the specified event, the processor 280 may read the stored information from the memory 230 and may provide the second application with the stored information.

According to another embodiment, the user information (i.e., the at least a portion of the user information used to verify or create the first account) used to create the second account may be provided to a process of the second application through IPC.

Figure 9:
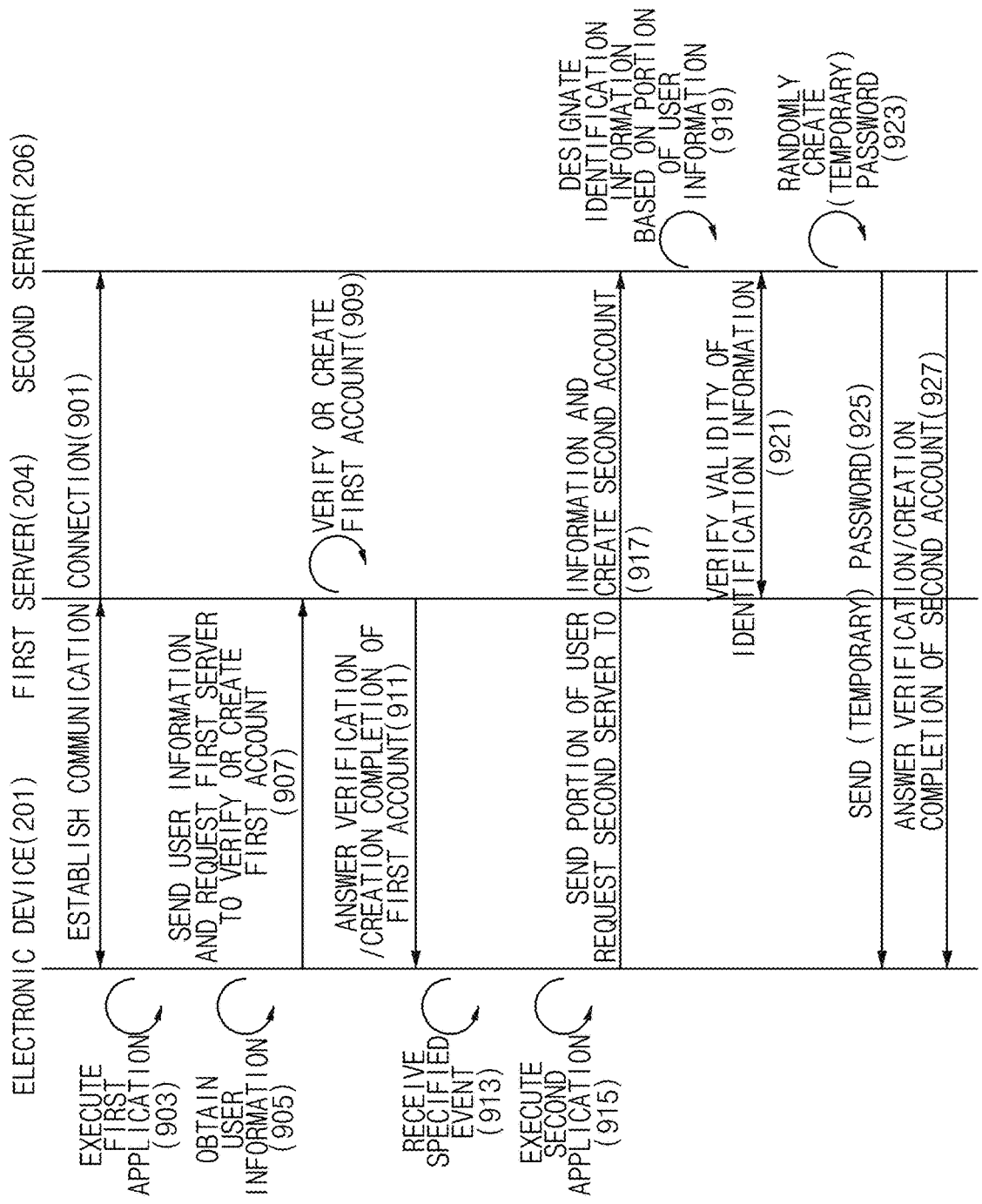
FIG. 9 illustrates a sequence diagram of a service account creating method of an electronic device, according to an embodiment.
Figure 10:
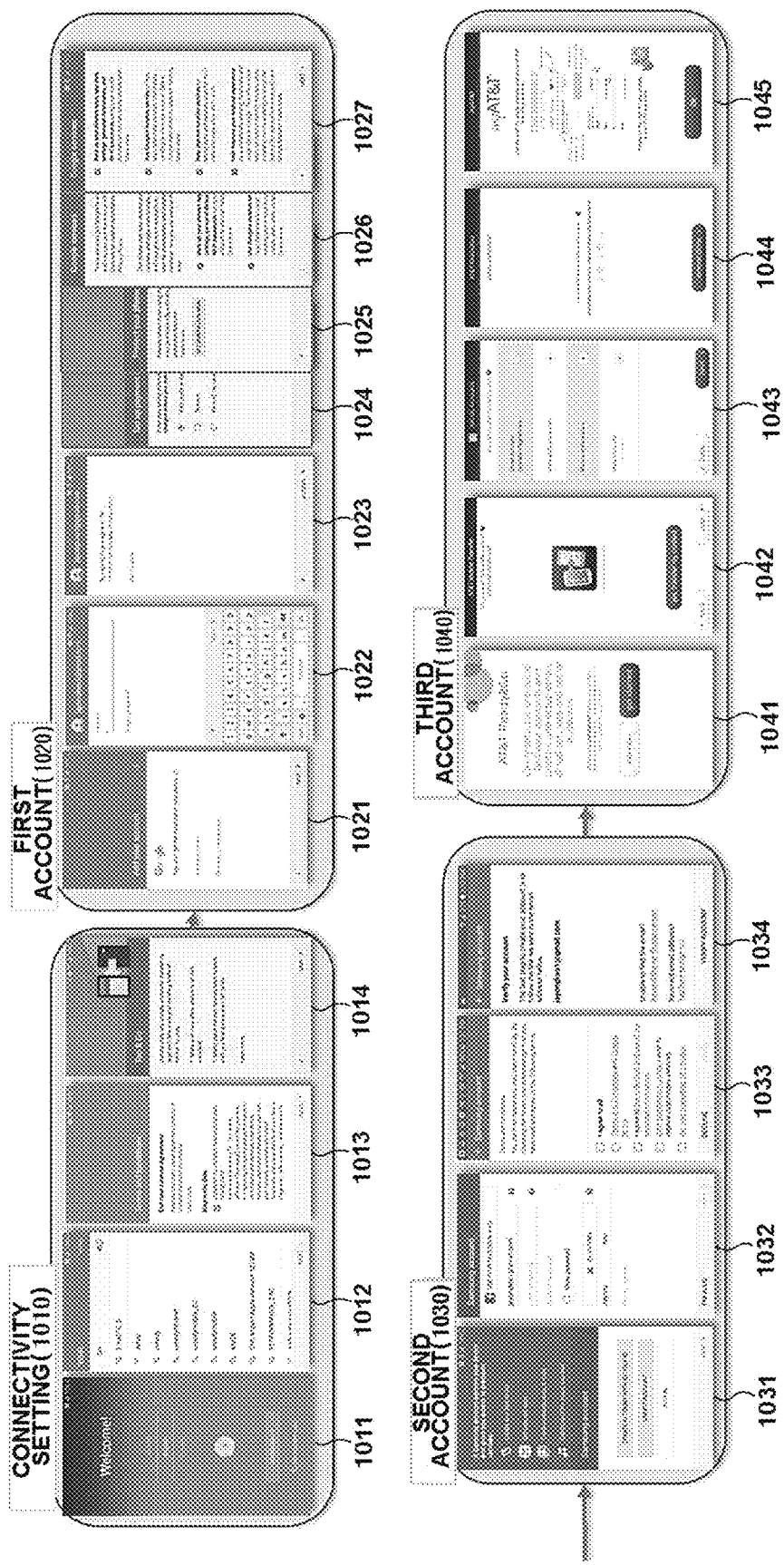
FIG. 10 illustrates a screen for describing verification/creation of an account of a general electronic device.

FIG. 9 illustrates a sequence diagram of a service account creating method of an electronic device, according to an embodiment.

Referring to FIG. 9, according to an embodiment, a method for creating a service account may include operation 901 to operation 927. Operation 901 to operation 927 may be executed by, for example, the electronic device 201, the first server 204, and the second server 206 that are illustrated in FIG. 2. For example, each operation in operation 901 to operation 909 may be implemented with instructions that are performed (or executed) by at least one processor. Hereinafter, operation 901 to operation 927 may be described by using the reference numeral of FIG. 2.

In operation 901, the electronic device 201 may establish a communication connection with the first server 204 and the second server 206. For example, the first server 204 and the second server 206 may respectively operate in conjunction with a first application and a second application that are executable in the electronic device 201.

In operation 903, the electronic device 201 may execute the first application that manages a first account.

In operation 905, the electronic device 201 may obtain user information for verifying or creating the first account through a UI screen or the like that is executed by the first application. According to an embodiment, for the first account and a second account to be created later, the electronic device 201 may store the obtained user information in a part of a shared memory.

In operation 907, the electronic device 201 may request the first server 204 to verify or create the first account. According to an embodiment, when the electronic device 201 requests the first server 204 to verify or create the first account, the electronic device 201 may send the user information, which is obtained in operation 905, to the first server 204.

In operation 909, the first server 204 may verify or create the first account based on the user information received from the electronic device 201.

In operation 911, after issuing a verification token of the first account, the first server 204 may provide the first application process with the verification token of the first account, while sending the result of verifying or creating the first account as a response to the electronic device 201.

In operation 913, the electronic device 201 may receive a specified event. The specified event may correspond to an event (i.e., an event for agreeing to create the second account based on the first account) for agreeing to create the second account, based on at least a portion of the user information used to verify or create the first account.

In operation 915, the electronic device 201 may execute the second application in response to the specified event.

In operation 917, the electronic device 201 may request the second server 206 to verify or create the second account, based on the second application that is being executed. According to an embodiment, when the electronic device 201 requests the second server 206 to verify or create the second account, the electronic device 201 may send the at least a portion of the user information (i.e., the at least a portion of the user information used to verify or create the first account), which is obtained in operation 905, to the second server 206. At least one of an email or a telephone number may be included in the at least a portion of the user information obtained in the operation 905.

In operation 919, the second server 206 may designate identification information (e.g., an ID of the second account) of the second account based on the user information (i.e., the at least a portion of the user information used to verify or create the first account) received from the electronic device 201. For example, the second server 206 may designate an email address or a telephone number, which is included in the user information received from the electronic device 201, as the ID of the second account.

In operation 921, the second server 206 may verify whether identification information (e.g., an email address or a telephone number) designated in operation 919 is valid, through interaction with the first server 204. This is the reason why the identification information corresponds to information used to verify or create the first account. According to an embodiment, the identification information is verified through comparison with a specified verification code. According to various embodiments, operation 923 may be omitted.

In operation 923, the second server 206 may arbitrarily (or randomly) create a password of the second account.

In operation 925, the second server 206 may send the password, which is created in operation 923, to an email address or a telephone number of the user information received in operation 917.

In operation 927, after issuing a verification token of the second account, the second server 206 may provide the second application process with a verification token, while sending the result of verifying or creating the second account as a response to the electronic device 201.

According to various embodiments of this disclosure, since the second account is created simply, various UI screens (e.g., the screens 1031 to 1034 of FIG. 10) for creating the second account may be omitted. That is, according to an embodiment of this disclosure, a process of creating the second account may be considerably omitted, thereby improving usage convenience of a user. In addition, since the second account is independently managed by a second server, communication traffic with a first server may be considerably reduced.

In this disclosure, it is described that the second account is created based on the first account. However, embodiments are not limited to details of this disclosure. For example, the user information obtained to verify or create the first account may be used to create a plurality of accounts, for example, the second account, the third account, and the like. Accordingly, in the case where the plurality of accounts is created, the usage convenience of the user may be improved compared with the related art.

As described above, according to an embodiment, a system may include a first server associated with a first application, a second server associated with a second application, and an electronic device that establishes communication connectivity with the first server and the second server. The electronic device may be configured to obtain user information by executing the first application, to verify or create a first account corresponding to the first application through interaction with the first server, based on the user information, and to create a second account corresponding to the second application through interaction with the second server, based on at least a portion of the user information if the second application is executed in response to a specified event.

According to another embodiment, each of the first application and the second application may correspond to an application that manages a service account of a user.

According to another embodiment, the specified event may correspond to an event for agreeing to create the second account based on the at least a portion of the user information.

According to another embodiment, the user information used to verify or create the first account may include a name, date of birth, an email address, a telephone number, or a combination thereof.

According to another embodiment, the at least a portion of the user information used to create the second account may include at least one of an email address or a telephone number.

According to another embodiment, in creation of the second account, the second server may be configured to receive the at least a portion of the user information from the electronic device and to designate the email address or the telephone number, which is included in the at least a portion of the user information, as identification information of the second account.

According to another embodiment, in creation of the second account, the second server may be configured to receive the at least a portion of the user information from the electronic device, to randomly create a password of the second account, and to send the password to the at least one of the email address or the telephone number included in the at least a portion of the user information.

According to an embodiment, an electronic device may include a memory configured to store a first application and a second application, a communication circuit configured to establish a communication connection with a first server associated with the first application and a second server associated with the second application, and a processor operatively connected with the memory and the communication circuit. The processor may be configured to obtain user information by executing the first application, to verify or create a first account corresponding to the first application through interaction with the first server, based on the user information, and to create a second account corresponding to the second application through interaction with the second server, based on at least a portion of the user information if the second application is executed in response to a specified event.

According to another embodiment, each of the first application and the second application may correspond to an application that manages a service account of a user.

According to another embodiment, the specified event may correspond to an event for agreeing to create the second account based on the at least a portion of the user information.

According to another embodiment, the user information used to verify or create the first account may include a name, date of birth, an email address, a telephone number, or a combination thereof.

According to another embodiment, the at least a portion of the user information used to create the second account may include at least one of an email address or a telephone number.

According to another embodiment, the at least a portion of the user information used to create the second account may be stored in the memory if the first account is verified or created, and the processor may be configured to read the at least a portion of the user information from the memory in response to the specified event and to provide the second application with the at least a portion of the user information.

According to another embodiment, the processor may be configured to provide a process of the second application with the at least a portion of the user information, which is used to create the second account, through IPC.

According to an embodiment, a method for creating a service account may include establishing, by an electronic device, a communication connection with a first server associated with a first application and a second server associated with a second application, obtaining, by the electronic device, user information by executing the first application, verifying or creating, by the electronic device, a first account corresponding to the first application through interaction with the first server, based on the user information, and creating, by the electronic device, a second account corresponding to the second application based on at least a portion of the user information through interaction with the second server if the second application is executed in response to a specified event.

According to another embodiment, each of the first application and the second application may correspond to an application that manages a service account of a user.

According to another embodiment, the specified event may correspond to an event for agreeing to create the second account based on the at least a portion of the user information.

According to another embodiment, the at least a portion of the user information used to create the second account may include at least one of an email address or a telephone number.

According to another embodiment, the method may further include receiving, by the second server, the at least a portion of the user information from the electronic device and designating, by the second server, the email address or the telephone number, which is included in the at least a portion of the user information, as identification information of the second account.

According to another embodiment, the method may further include receiving, by the second server, the at least a portion of the user information from the electronic device, randomly creating, by the second server, a password of the second account, and sending, by the second server, the password to the at least one of the email address or the telephone number included in the at least a portion of the user information.

According to an embodiment, an electronic device may include a display, a memory configured to store a first application and a second application, a communication circuit configured to establish a communication connection with a first server associated with the first application and a second server associated with the second application and a processor electrically connected with the memory and the communication circuit. The processor may be configured to output a first user interface (UI) screen of the first application in the display, to obtain user information through the first UI screen, to verify or create a first account corresponding to the first application through interaction with the first server by using the user information, to output a second UI screen of the second application if the first account is verified or created and to create a second account corresponding to the second application through interaction with the second server by using at least a portion of the user information if a specified object included in the second UI screen is selected.

According to another embodiment, the at least a portion of the user information used to create the second account may be stored in the memory if the first account is verified or created. The processor may be configured to read the at least a portion of the user information from the memory and to provide the second application with the at least a portion of the user information if the specified object included in the second UI screen is selected.

According to another embodiment, the second UI screen may further include at least one user input field. The processor may be configured to verify the second account through the interaction with the second server by using information entered through the at least one user input field.

According to another embodiment, the input information may include an identifier (ID) and a password.

Figure 11:
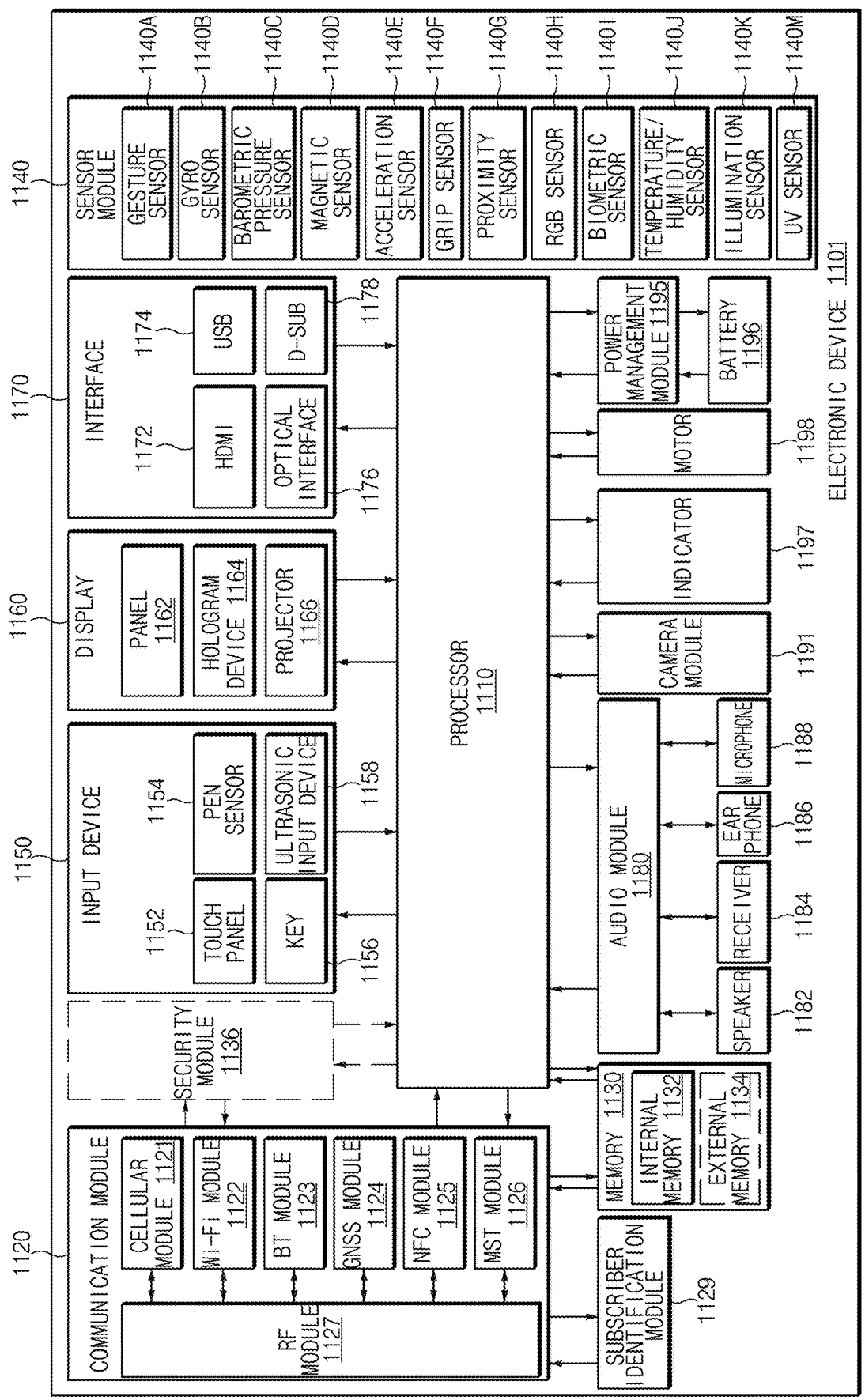
FIG. 11 illustrates an electronic device, according to various embodiments.

FIG. 11 illustrates a block diagram of an electronic device, according to various embodiments.

Referring to FIG. 11, an electronic device 1101 may include, for example, all or a part of the electronic device 201 illustrated in FIG. 2. The electronic device 1101 may include one or more processors (e.g., an application processor (AP)) 1110, a communication module 1120, a subscriber identification module 1124, a memory 1130, a sensor module 1140, an input device 1150, a display 1160, an interface 1170, an audio module 1180, a camera module 1191, a power management module 1195, a battery 1196, an indicator 1197, and a motor 1198.

The processor 1110 may drive an operating system (OS) or an application program to control a plurality of hardware or software elements connected to the processor 1110 and may process and compute a variety of data. For example, the processor 1110 may be implemented with a System on Chip (SoC). According to an embodiment, the processor 1110 may further include a graphic processing unit (GPU) and/or an image signal processor (ISP). The processor 1110 may include at least a part (e.g., a cellular module 1121) of elements illustrated in FIG. 2. The processor 1110 may load and process an instruction or data, which is received from at least one of other elements (e.g., a nonvolatile memory), and may store a variety of data in a nonvolatile memory.

The communication module 1120 may be configured the same as or similar to a communication circuit 260 of FIG. 2. The communication module 1120 may include a cellular module 1121, a Wi-Fi module 1122, a Bluetooth (BT) module 1123, a GNSS module 1124 (e.g., a GPS module, a Glonass module, a Beidou module, or a Galileo module), a near field communication (NFC) module 1125, a MST module 1126, and a radio frequency (RF) module 1127.

The cellular module 1121 may provide a voice call, a video call, a character service, an Internet service, or the like over a communication network. According to an embodiment, the cellular module 1121 may perform discrimination and authentication of the electronic device 1101 within a communication network using the subscriber identification module 1129 (e.g., a SIM card). According to an embodiment, the cellular module 1121 may perform at least a part of functions that the processor 1110 provides. According to an embodiment, the cellular module 1121 may include a communication processor (CP).

Each of the Wi-Fi module 1122, the BT module 1123, the GNSS module 1124, the NFC module 1125, or the MST module 1126 may include a processor that processes data exchanged through a corresponding module, for example. According to an embodiment, at least a part (e.g., two or more elements) of the cellular module 1121, the Wi-Fi module 1122, the BT module 1123, the GNSS module 1124, the NFC module 1125, or the MST module 1126 may be included within one Integrated Circuit (IC) or an IC package.

The RF module 1127 may send and receive, for example, a communication signal (e.g., an RF signal). For example, the RF module 1127 may include a transceiver, a power amplifier module (PAM), a frequency filter, a low noise amplifier (LNA), an antenna, or the like. According to another embodiment, at least one of the cellular module 1121, the Wi-Fi module 1122, the BT module 1123, the GNSS module 1124, the NFC module 1125, or the MST module 1126 may send and receive an RF signal through a separate RF module.

The subscriber identification module 1129 may include, for example, a card and/or embedded SIM which includes a subscriber identification module and may include unique identification information (e.g., integrated circuit card identifier (ICCID)) or subscriber information (e.g., integrated mobile subscriber identity (IMSI)).

The memory 1130 (e.g., the memory 230) may include an internal memory 1132 or an external memory 1134. For example, the internal memory 1132 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 1134 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1134 may be operatively and/or physically connected with the electronic device 1101 through various interfaces.

The security module 1136 may be a module that includes a storage space of which the security level is higher than that of the memory 1130 and may be a circuit that guarantees safe data storage and a protected execution environment. The security module 1136 may be implemented with a separate circuit and may include a separate processor. For example, the security module 1136 may be in a smart chip or a secure digital (SD) card, which is removable, or may include an embedded secure element (eSE) embedded in a fixed chip of the electronic device 1101. Furthermore, the security module 1136 may operate based on an operating system (OS) that is different from the OS of the electronic device 1101. For example, the security module 1136 may operate based on Java card open platform (JCOP) OS.

The sensor module 1140 may measure, for example, a physical quantity or may detect an operation state of the electronic device 1101. The sensor module 1140 may convert the measured or detected information to an electric signal. For example, the sensor module 1140 may include at least one of, for example, a gesture sensor 1140A, a gyro sensor 1140B, a pressure sensor 1140C, a magnetic sensor 1140D, an acceleration sensor 1140E, a grip sensor 1140F, a proximity sensor 1140G, a color sensor 1140H (e.g., a red, green, blue (RGB) sensor), a biometric sensor 1140I, a temperature/humidity sensor 1140J, an illuminance sensor 1140K, or an ultra violet (UV) sensor 1140M. Additionally or generally, the sensor module 1140 may further include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 1140 may further include a control circuit that controls at least one or more sensors included therein. According to an embodiment, the electronic device 1101 may further include a processor which is a part of the processor 1110 or independent of the processor 1110 and is configured to control the sensor module 1140. The processor may control the sensor module 1140 while the processor 1110 remains at a sleep state.

The input device 1150 may include, for example, a touch panel 1152, a (digital) pen sensor 1154, a key 1156, or an ultrasonic input device 1158. The touch panel 1152 may use at least one of capacitive, resistive, infrared and ultrasonic detecting methods. Also, the touch panel 1152 may further include a control circuit. The touch panel 1152 may further include a tactile layer to provide a tactile reaction to a user.

The (digital) pen sensor 1154 may be, for example, a part of a touch panel or may include an additional sheet for recognition. The key 1156 may include, for example, a physical button, an optical key, a keypad, and the like. The ultrasonic input device 1158 may detect (or sense) an ultrasonic signal, which is generated from an input device, through a microphone (e.g., a microphone 1188) and may check data corresponding to the detected ultrasonic signal.

The display 1160 (e.g., the display 220) may include a panel 1162, a hologram device 1164, or a projector 1166. The panel 1162 may be configured the same as or similar to the display 220 of FIG. 2. The panel 1162 may be implemented to be flexible, transparent or wearable, for example. The panel 1162 and the touch panel 1152 may be integrated into a single module. The hologram device 1164 may display a stereoscopic image in a space by using a light interference phenomenon. The projector 1166 may project light onto a screen so as to display an image. The screen may be arranged inside or outside the electronic device 1101. According to an embodiment, the panel 1162 may include a pressure sensor (or a force sensor) that is capable of measuring the intensity of pressure on the touch of a user. The pressure sensor may be implemented with a combination with the touch panel 1152 or may be implemented with one or more sensors that are independent of the touch panel 1152. According to an embodiment, the display 1160 may further include a control circuit that controls the panel 1162, the hologram device 1164, or the projector 1166.

The interface 1170 may include, for example, a high-definition multimedia interface (HDMI) 1172, a universal serial bus (USB) 1174, an optical interface 1176, or a D-subminiature (D-sub) 1178. The interface 1170 may be included, for example, in the communication circuit 260 illustrated in FIG. 2. Additionally or generally, the interface 1170 may include, for example, a mobile high definition link (MHL) interface, a SD card/multi-media card (MMC) interface, or an infrared data association (IrDA) standard interface.

The audio module 1180 may convert a sound and an electric signal in dual directions. At least a part of the audio module 1180 may be included, for example, in the input/output interface 250 illustrated in FIG. 2. The audio module 1180 may process, for example, sound information that is input or output through a speaker 1182, a receiver 1184, an earphone 1186, or a microphone 1188.

The camera module 1191 that shoots a still image or a video may include, for example, at least one image sensor (e.g., a front sensor or a rear sensor), a lens, an image signal processor (ISP), or a flash (e.g., an LED or a xenon lamp).

The power management module 1195 may manage, for example, power of the electronic device 1101. According to an embodiment, a power management integrated circuit (PMIC) a charger IC, or a battery or fuel gauge may be included in the power management module 1195. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1196 and a voltage, current or temperature thereof while the battery is charged. The battery 1196 may include, for example, a rechargeable battery or a solar battery.

The indicator 1197 may display a specific state of the electronic device 1101 or a part thereof (e.g., the processor 1110), such as a booting state, a message state, a charging state, and the like. The motor 1198 may convert an electrical signal into a mechanical vibration and may generate the following effects: vibration, haptic, and the like. Although not illustrated in FIG. 11, the electronic device 1101 may include a processing device (e.g., a GPU) that supports a mobile TV. The processing device that supports a mobile TV may process media data according to the standards of digital multimedia broadcasting (DMB), digital video broadcasting (DVB), MediaFlo™, or the like.

Each of the above-mentioned elements of the electronic device described in this disclosure may be configured with one or more components, and the names of the elements may be changed according to the type of the electronic device. According to various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 12:
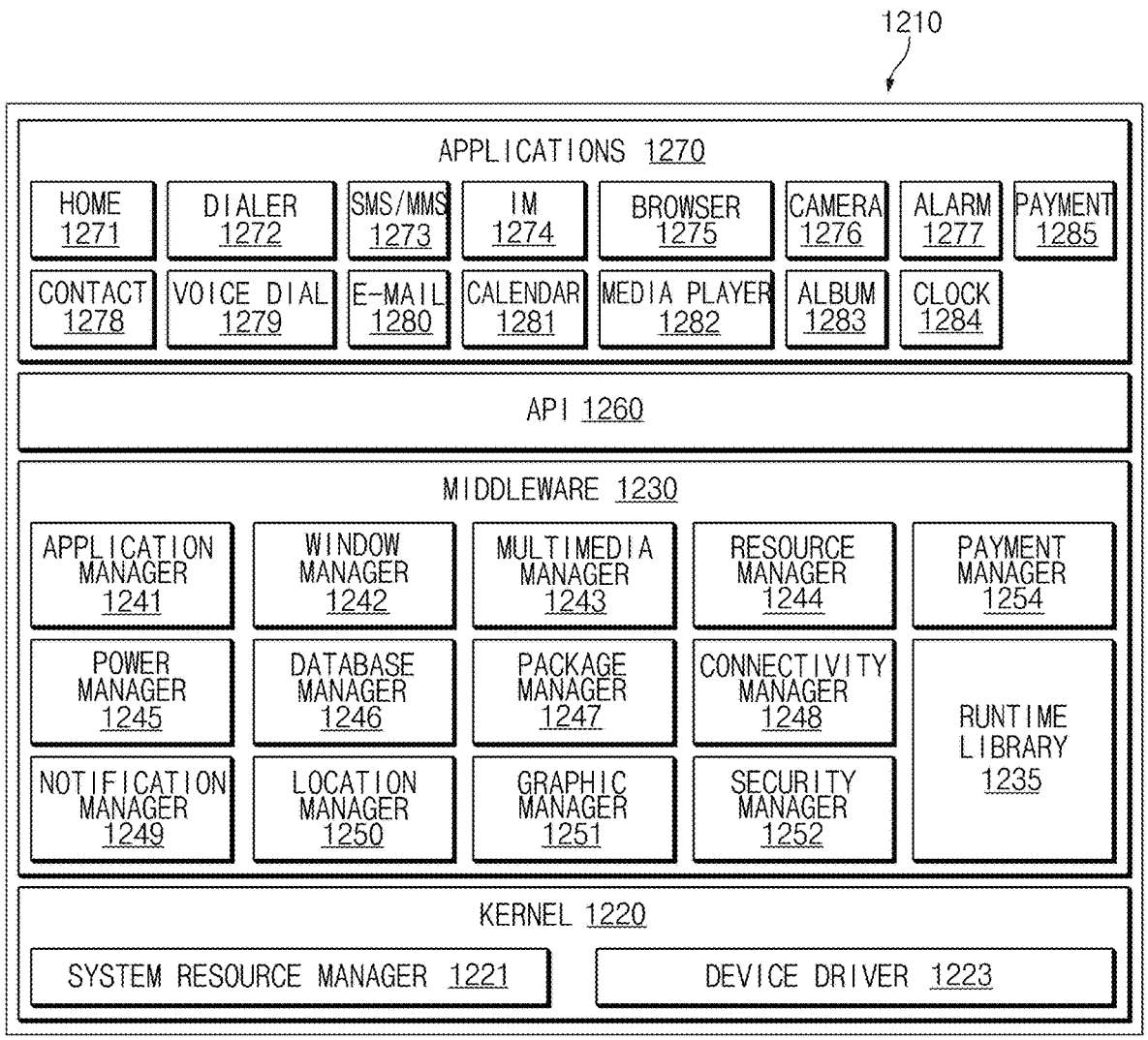
FIG. 12 illustrates a program module according to various embodiments.

FIG. 12 illustrates a block diagram of a program module according to various embodiments.

According to an embodiment, a program module 1210 (e.g., the program 240) may include an operating system (OS) to control resources associated with an electronic device (e.g., the electronic device 201), and/or diverse applications (e.g., the application program 247) driven on the OS. The OS may be, for example, ANDROID®, iOS®, WINDOWS®, SYMBIAN®, TIZEN®, or SAMSUNG BADA OS®.

The program module 1210 may include a kernel 1220, a middleware 1230, an application programming interface (API) 1260, and/or an application 1270. At least a part of the program module 1210 may be preloaded on an electronic device or may be downloadable from an external electronic device (e.g., the electronic device 202, the servers 204 and 206, and the like).

The kernel 1220 (e.g., the kernel 241) may include, for example, a system resource manager 1221, or a device driver 1223. The system resource manager 1221 may control, allocate, or retrieve system resources. According to an embodiment, the system resource manager 1221 may include a process managing part, a memory managing part, a file system managing part, or the like. The device driver 1223 may include, for example, a display driver, a camera driver, a Bluetooth driver, a common memory driver, an USB driver, a keypad driver, a Wi-Fi driver, an audio driver, or an IPC driver.

The middleware 1230 may provide, for example, a function which the application 1270 needs in common or may provide diverse functions to the application 1270 through the API 1260 to allow the application 1270 to efficiently use limited system resources of the electronic device. According to an embodiment, the middleware 1230 (e.g., the middleware 243) may include at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, or a security manager 1252, or a payment manager 1254.

The runtime library 1235 may include, for example, a library module which is used by a compiler to add a new function through a programming language while the application 1270 is being executed. The runtime library 1235 may perform input/output management, memory management, or capacities about arithmetic functions.

The application manager 1241 may manage, for example, a life cycle of at least one application of the application 1270. The window manager 1242 may manage a graphic user interface (GUI) resource which is used in a screen. The multimedia manager 1243 may identify a format necessary for playing diverse media files, and may perform encoding or decoding of media files by using a codec suitable for the format. The resource manager 1244 may manage resources such as a storage space, a memory, or a source code of at least one application of the application 1270.

The power manager 1245 may operate, for example, with a basic input/output system (BIOS) to manage a battery or power, and may provide power information for an operation of an electronic device. The database manager 1246 may generate, search for, or modify database which is to be used in at least one application of the application 1270. The package manager 1247 may install or update an application which is distributed in the form of a package file.

The connectivity manager 1248 may manage, for example, a wireless connection such as Wi-Fi or Bluetooth. The notification manager 1249 may display or notify an event such as arrival message, appointment, or proximity notification in a mode that does not disturb a user. The location manager 1250 may manage location information of an electronic device. The graphic manager 1251 may manage a graphic effect that is provided to a user, or manage a user interface relevant thereto. The security manager 1252 may provide a general security function necessary for system security, user authentication, or the like. According to an embodiment, in the case where an electronic device (e.g., the electronic device 201) includes a telephony function, the middleware 1230 may further includes a telephony manager for managing a voice or video call function of the electronic device.

The middleware 1230 may include a middleware module that combines diverse functions of the above-described elements. The middleware 1230 may provide a module specialized to each OS kind to provide differentiated functions. In addition, the middleware 1230 may remove a part of the preexisting elements, dynamically, or may add new elements thereto.

The API 1260 (e.g., the API 245) may be, for example, a set of programming functions and may be provided with a configuration which is variable depending on an OS. For example, in the case where an OS is ANDROID® or iOS ®, it may provide one API set per platform. In the case where an OS is TIZEN®, it may provide two or more API sets per platform.

The application 1270 (e.g., the application program 247) may include, for example, one or more applications capable of providing functions for a home 1271, a dialer 1272, an SMS/MMS 1273, an instant message (IM) 1274, a browser 1275, a camera 1276, an alarm 1277, a contact 1278, a voice dial 1279, an e-mail 1280, a calendar 1281, a media player 1282, an album 1283, and a clock 1284, or for offering health care (e.g., measuring an exercise quantity or blood sugar) or environment information (e.g., information of barometric pressure, humidity, or temperature).

According to an embodiment, the application 1270 may include an application (hereinafter referred to as "information exchanging application" for descriptive convenience) to support information exchange between the electronic device (e.g., the electronic device 201) and an external electronic device (e.g., the electronic device 202). The information exchanging application may include, for example, a notification relay application for transmitting specific information to the external electronic device, or a device management application for managing the external electronic device.

For example, the information exchanging application may include a function of transmitting notification information, which arise from other applications (e.g., applications for SMS/MMS, e-mail, health care, or environmental information), to an external electronic device (e.g., the electronic device 202). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., the electronic device 202) which communicates with the electronic device, an application running in the external electronic device, or a service (e.g., a call service, a message service, or the like) provided from the external electronic device.

According to an embodiment, the application 1270 may include an application (e.g., a health care application of a mobile medical device) which is assigned in accordance with an attribute of an external electronic device (e.g., the electronic device 202). According to an embodiment, the application 1270 may include an application which is received from an external electronic device (e.g., the server 204 or 206 or the electronic device 202). According to an embodiment, the application 1270 may include a preloaded application or a third party application which is downloadable from a server. The titles of elements in the program module 1210 according to the embodiment may be modifiable depending on kinds of operating systems.

According to various embodiments, at least a part of the program module 1210 may be implemented by software, firmware, hardware, or a combination of two or more thereof. At least a part of the program module 1210 may be implemented (e.g., executed), for example, by a processor (e.g., the processor 1110). At least a portion of the program module 1210 may include, for example, modules, programs, routines, sets of instructions, processes, or the like, for performing one or more functions.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 280), may cause the one or more processors to perform a function corresponding to the instruction. The computer-readable storage media, for example, may be the memory 230.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate as one or more software modules to perform an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, a part of operations may be executed in different sequences or may be omitted. Alternatively, other operations may be added.

According to various embodiments of this disclosure, since a second account is created with only a simple operation, various UI screens (e.g., the screens 1031 to 1034 of FIG. 10) for creating the second account may be considerably omitted. That is, according to an embodiment of this disclosure, a creation process of the second account may be considerably omitted, thereby improving usage convenience of a user. In addition, since the second account is independently managed by a second server, communication traffic with a first server may be considerably resolved. Besides, a variety of effects directly or indirectly understood through this disclosure may be provided.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A system for creating a service account, the system comprising:
    a first server associated with a first application;
    a second server associated with a second application; and
    an electronic device configured to communicate with the first server and the second server,
    wherein the electronic device is configured to:
        receive user information from a user by the first application,
        verify or generate a first account corresponding to the first application through interaction with the first server based on the user information,
        receive the user information by the second application from the first application without receiving an input of the user information to the second application from the user, and
        generate a second account corresponding to the second application through interaction with the second server, based on the user information when the second application is executed in response to a specified event.

2. The system of claim 1, wherein each of the first application and the second application corresponds to an application that manages a service account.

3. The system of claim 1, wherein the specified event corresponds to an event for generating the second account based on the user information.

4. The system of claim 1, wherein the user information used to verify or generate the first account comprises at least one of a name, a date of birth, an email address, a telephone number, or a combination thereof.

5. The system of claim 1, wherein the user information used to generate the second account comprises at least one of an email address or a telephone number.

6. The system of claim 5, wherein in generating the second account, the second server is configured to:
    receive the user information from the electronic device; and
    designate the email address or the telephone number, which is included in the user information, as identification information of the second account.

7. The system of claim 5, wherein in generating the second account, the second server is configured to:
    receive the user information from the electronic device;
    randomly generate a password for the second account; and
    transmit the password to the at least one of the email address or the telephone number included in the user information.

8. An electronic device comprising:
    a memory configured to store a first application and a second application;
    a communication circuit configured to establish a communication connection with a first server associated with the first application and a second server associated with the second application; and
    a processor operatively connected with the memory and the communication circuit,
    wherein the processor is configured to:
        receive user information from a user by the first application,
        verify or generate a first account corresponding to the first application through interaction with the first server, based on the user information,
        receive the user information by the second application from the first application without receiving an input of the user information to the second application from the user, and
        generate a second account corresponding to the second application through interaction with the second server, based on the user information if the second application is executed in response to a specified event.

9. The electronic device of claim 8, wherein each of the first application and the second application corresponds to an application that manages a service account.

10. The electronic device of claim 8, wherein the specified event corresponds to an event for generating the second account based on the user information.

11. The electronic device of claim 8, wherein the user information used to verify or generate the first account comprises at least one of a name, a date of birth, an email address, a telephone number, or a combination thereof.

12. The electronic device of claim 8, wherein the user information used to generate the second account comprises at least one of an email address or a telephone number.

13. The electronic device of claim 8, wherein the processor is configured to:
    control the first application to transmit the user information to the memory if the first account is verified or generated, and
    control the second application to read the user information from the memory in response to the specified event.

14. The electronic device of claim 8, wherein the processor is configured to provide a process of the second application with the user information, which is used to generate the second account, through inter-process communication (IPC).

15. An electronic device comprising:
- a display;
- a memory configured to store a first application and a second application;
- a communication circuit configured to establish a communication connection with a first server associated with the first application and a second server associated with the second application; and
- a processor electrically connected with the memory and the communication circuit, wherein the processor is configured to:
- output a first user interface (UI) screen of the first application in the display,
- receive user information from a user through the first UI screen,
- verify or generate a first account corresponding to the first application through interaction with the first server by using the user information,
- receive the user information by the second application from the first application without receiving an input of the user information to the second application from the user,
- output a second UI screen of the second application including the user information if the first account is verified or generated, and
- generate a second account corresponding to the second application through interaction with the second server by using the user information if a specified object included in the second UI screen is selected.

16. The electronic device of claim 15, wherein the processor is configured to:
- control the first application to transmit the user information to the memory if the first account is verified or generated, and
- control the second application to read the user information from the memory if the specified object included in the second UI screen is selected.

17. The electronic device of claim 15, wherein the second UI screen further comprises a user input field, and
- wherein the processor is configured to verify the second account through the interaction with the second server by using information entered through the user input field.

18. The electronic device of claim 17, wherein the information entered through the user input field comprises a password.

* * * * *